US011641621B2

(12) United States Patent
Baki et al.

(10) Patent No.: US 11,641,621 B2
(45) Date of Patent: May 2, 2023

(54) CLOUD-BASED PROVISIONING USING PEER DEVICES

(71) Applicant: Amazon Technologies, Inc., Seattle, WA (US)

(72) Inventors: Omar Abdul Baki, Seattle, WA (US); Jin Guo, Cupertino, CA (US); Thomas Werner Kuehnel, Seattle, WA (US); King Shaw, Saratoga, CA (US)

(73) Assignee: Amazon Technologies, Inc., Seattle, WA (US)

(*) Notice: Subject to any disclaimer, the term of this patent is extended or adjusted under 35 U.S.C. 154(b) by 37 days.

(21) Appl. No.: 16/855,430

(22) Filed: Apr. 22, 2020

(65) Prior Publication Data

US 2020/0314743 A1    Oct. 1, 2020

Related U.S. Application Data

(63) Continuation of application No. 14/757,612, filed on Dec. 23, 2015, now Pat. No. 10,638,417.

(51) Int. Cl.
| | |
|---|---|
| H04W 12/06 | (2021.01) |
| H04W 48/20 | (2009.01) |
| H04W 24/02 | (2009.01) |
| H04W 84/12 | (2009.01) |

(52) U.S. Cl.
CPC ........... H04W 48/20 (2013.01); H04W 12/06 (2013.01); H04W 24/02 (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2006/0274899 | A1* | 12/2006 | Zhu | H04L 9/083 380/281 |
| 2012/0003958 | A1* | 1/2012 | Hossain | H04W 12/08 455/411 |
| 2014/0006569 | A1* | 1/2014 | Ferrazzini | H04L 12/2809 709/220 |
| 2014/0181521 | A1* | 6/2014 | Hemphill | H04L 9/0819 713/171 |
| 2014/0280810 | A1* | 9/2014 | Gabrielson | H04L 12/6418 709/222 |
| 2015/0106887 | A1* | 4/2015 | Aslund | H04W 12/06 726/5 |
| 2015/0382198 | A1* | 12/2015 | Kashef | H04W 4/50 726/5 |
| 2016/0021610 | A1* | 1/2016 | Wan | H04L 63/0876 370/329 |
| 2016/0028770 | A1* | 1/2016 | Raleigh | H04W 4/00 726/1 |

(Continued)

*Primary Examiner* — Nicholas Sloms
(74) *Attorney, Agent, or Firm* — Pierce Atwood LLP

(57) ABSTRACT

A system in which a device may automatically provision another device with credentials, at the behest of a cloud-based service, based in part on the physical proximity of the device to be provisioned. The provisioning device and the device to be provisioned may use a radio access technology (RAT) with a limited radio range. Account information associated with the device to be provisioned is known to the cloud-based service, which authenticates the device to be provisioned via the device with credentials.

20 Claims, 15 Drawing Sheets

(56) References Cited

U.S. PATENT DOCUMENTS

| | | | |
|---|---|---|---|
| 2016/0073439 A1* | 3/2016 | Palin | H04W 76/14 455/41.2 |
| 2016/0105424 A1* | 4/2016 | Logue | H04L 12/2809 726/7 |
| 2016/0134488 A1* | 5/2016 | Straub | H04L 63/06 726/4 |
| 2016/0143033 A1* | 5/2016 | Falkenstein, Jr. | H04B 7/15 370/338 |
| 2016/0174277 A1* | 6/2016 | Yoon | H04W 4/80 370/338 |
| 2016/0255077 A1* | 9/2016 | Lee | H04L 63/0272 713/159 |
| 2017/0063838 A1* | 3/2017 | Yin | H04L 63/0823 |
| 2017/0339514 A1* | 11/2017 | Kwon | H04W 4/80 |

\* cited by examiner

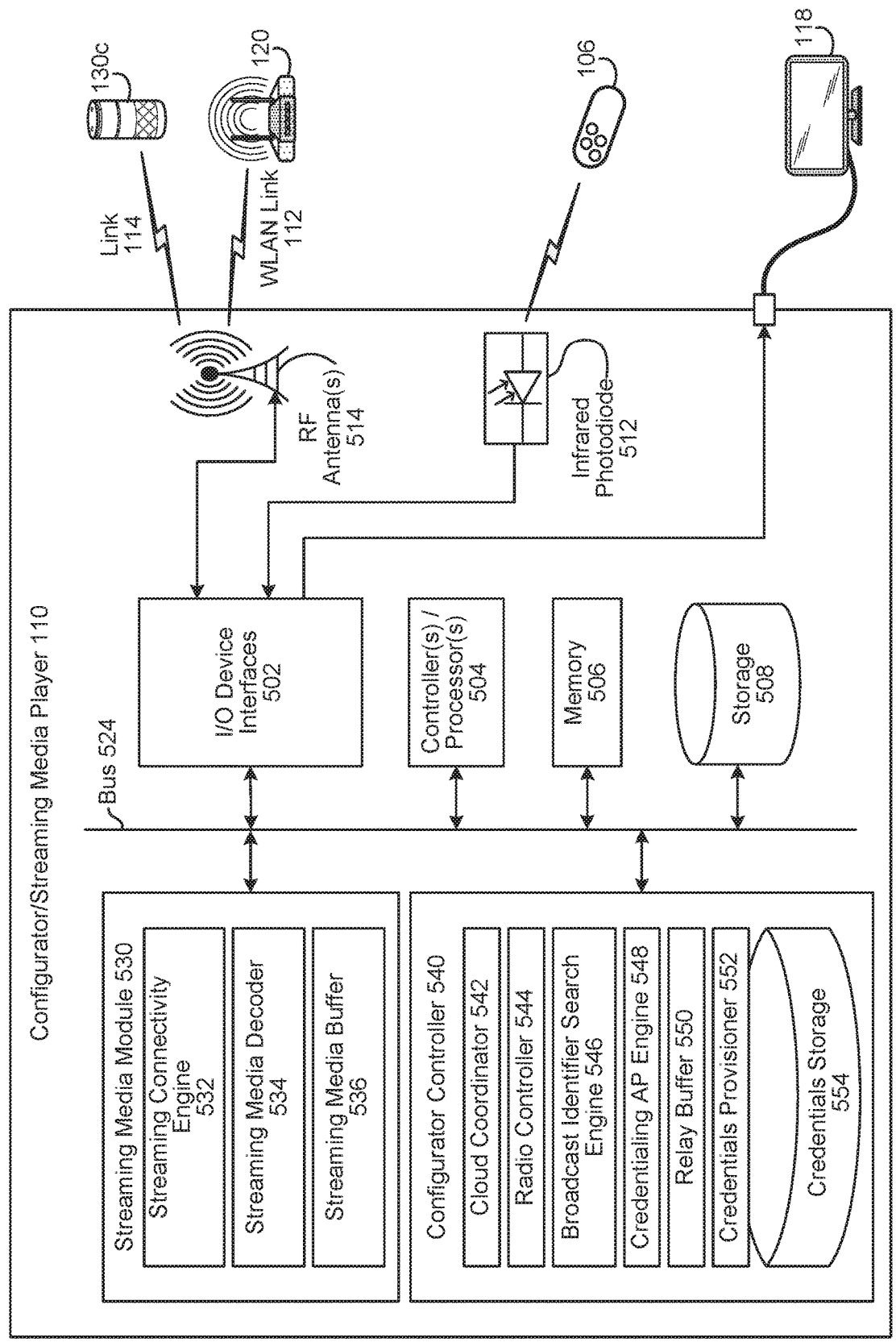

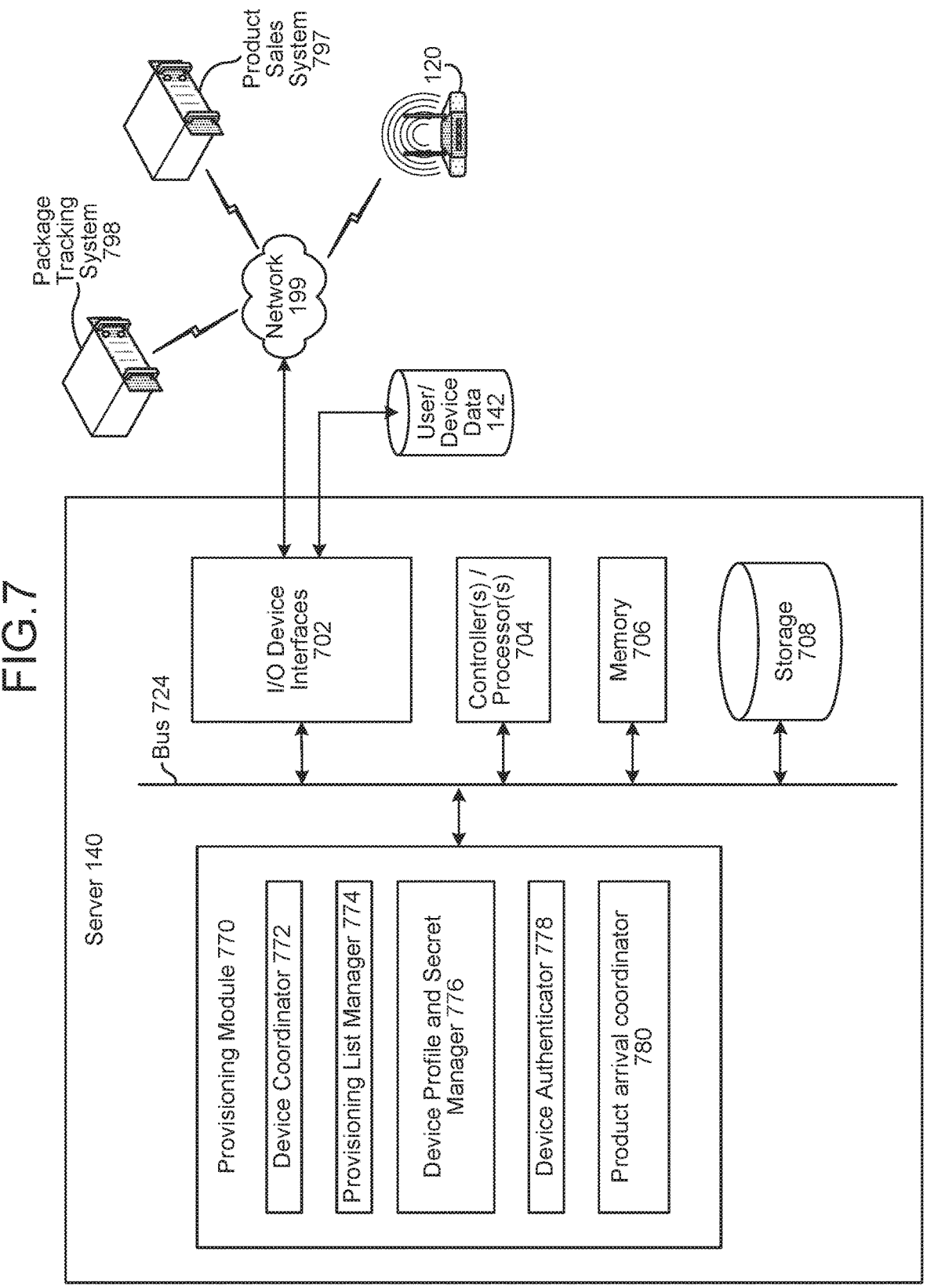

CLOUD-BASED PROVISIONING USING PEER DEVICES

CROSS-REFERENCE TO RELATED APPLICATION

This application is a continuation of, and claims the benefit of priority to, U.S. Non-provisional patent application Ser. No. 14/757,612, filed Dec. 23, 2015 and entitled "CLOUD-BASED PROVISIONING USING PEER DEVICES", and which is scheduled to issue as U.S. Pat. No. 10,638,417, which is expressly incorporated herein by reference in its entirety.

BACKGROUND

Physical devices that are not classically thought of as "personal computers" may now connect to the Internet. Devices ranging from soda machines to televisions to light bulbs may now have a network presence independent of any "traditional" personal computer. Such devices are sometimes referred to as belonging to the "Internet of Things," where ordinary physical objects are seamlessly integrated into the information network, allowing them to be abstractly represented and interacted with remotely.

BRIEF DESCRIPTION OF DRAWINGS

For a more complete understanding of the present disclosure, reference is now made to the following description taken in conjunction with the accompanying drawings.

FIG. 5 is a block diagram conceptually illustrating example components of a network-connected device that provisions other devices.

FIG. 7 is a block diagram conceptually illustrating example components of a computer server implementing the cloud-based service that orchestrates provisioning.

DETAILED DESCRIPTION

Every time a new wireless device is brought into the home, consumers must configure the device, providing the device the credentials (e.g., network name, password) of their local wireless network. One approach for this, especially on "displayless" devices without a built-in display screen or a connection to support/drive a display screen (sometimes referred to as "headless" devices), is to connect to an embedded web server built into the new device, enter the local wireless network access point's name (also known as its service set identifier or SSID for some protocols) and password into a web page provided by the web server, and submit these two pieces of information to the new device.

Provisioning a new device for network and account information can be cumbersome. This is particularly true when the device is headless (i.e. has no user interface (UI), or a limited UI). It can also be time consuming for a user when multiple devices need to be provisioned. Preferably, all of the devices could be automatically provisioned with new credentials once one device is updated. This is true of both new devices, as well when infrastructure changes are made such as replacing, adding, or re-credentialing network access points.

Figure 1:
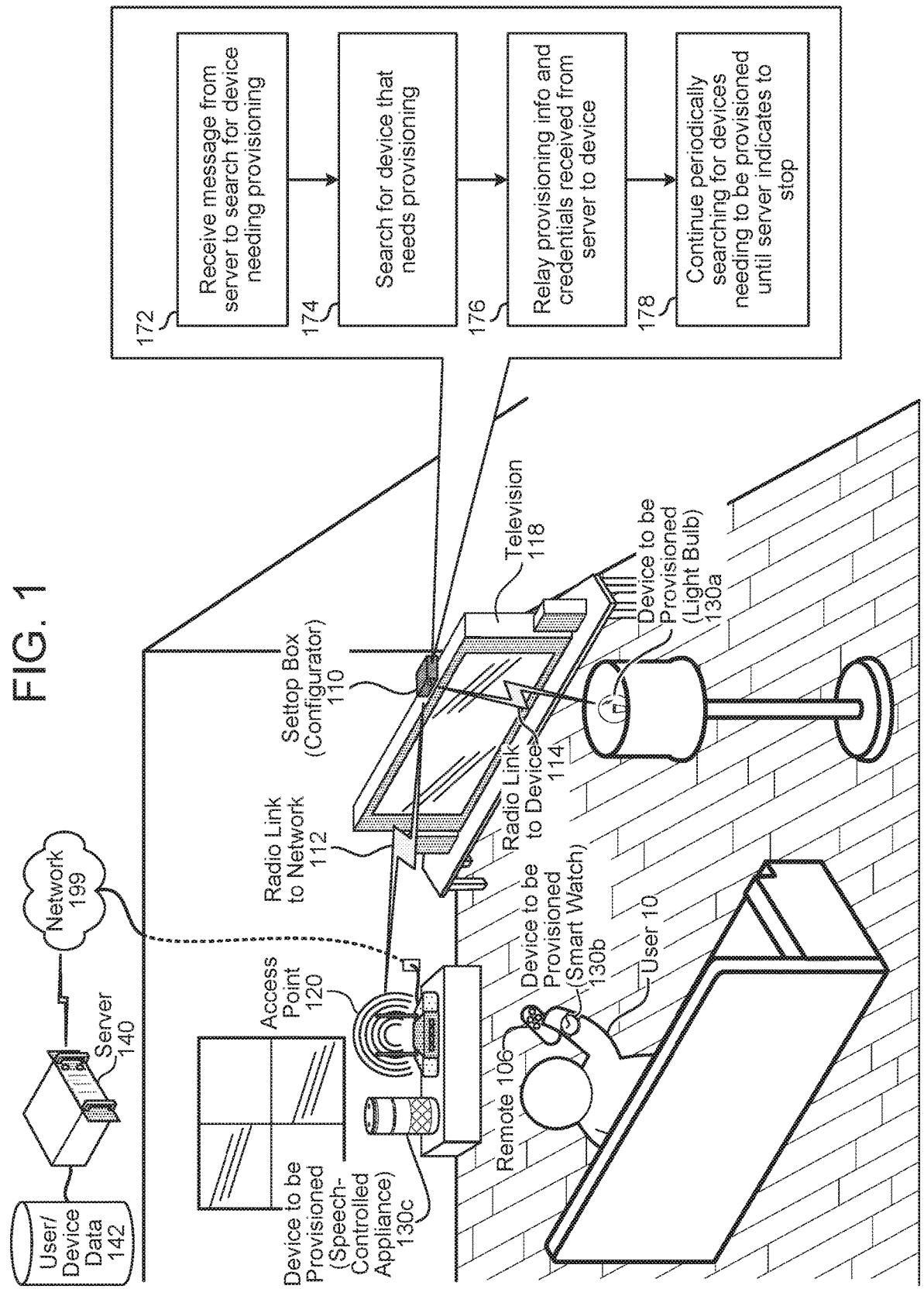
FIG. 1 illustrates a system for a cloud-based service triggering the provisioning of devices that need credentials by another nearby device.

FIG. 1 illustrates a system in which a configuring device 110 may automatically provision another device 130 with credentials based in part on the physical proximity of the device 130 to be provisioned. The configurator device 110 and the device to be provisioned 130 may use a radio access technology (RAT) with a limited radio range, or the device to be provisioned 130 may have connectivity to the cloud (e.g., the Internet), and provisioning may be performed via the cloud (e.g., network 199). In either case, the private information associated with the device to be provisioned 130 (e.g., registration of the device, digital certificate, public key, shared secret) may be known or authenticated, without a user/customer 10 of the device 130 needing to log in to an account.

With the account/registration of a device to be provisioned 130 bound to the device, previously stored credentials can be fetched from the cloud (e.g., from server 140) and provisioned to the device. This may be accomplished via a 'leaky' or 'parasite' connection to the provisioning service in the cloud, or by connecting to the provisioning service using a different RAT. Provisioning information may include, among other things, a broadcast identifier of the customer access point 120 that the device 130 should connect to the network through, credentials to access the access point 120, credentials to access the user's account, software that is licensed through the user's account, and configuration settings associated with the user account to be used by the device 130.

For example, a set-top box (STB) 110 downloading streaming video via a wireless network connection 112, rendering the video, and outputting the rendered video to a display, may be configured buffer a sufficient amount of video to maintain smooth video while the STB diverts its wireless resources to briefly search for devices and detect to be provisioned, using time-division multiplexing (TDM) to alternate allocation of the wireless radio resources between its connection to the access point 120 and searching for, detecting, and/or communicating with the device to be provisioned 130. The STB then resumes downloading the streaming video without ever having interrupted the rendering and outputting of video to a display (e.g., television 118), such that a user/customer 10 would not recognize that the STB temporarily broke the connection 112 to the video streaming service.

While the network connection is briefly interrupted, the configurator device 110 (in this example a STB) scans one or more RATs for indications that a device needs to be provisioned, scanning for a broadcast identifier such as scanning IEEE 802.11 Wi-Fi for known Service Set Identifiers (SSIDs) or scanning Bluetooth low energy (BTLE) for known beacons.

Using Wi-Fi as an example, the configurator device 110 periodically scans for access points (APs) that are created by devices that want to be provisioned. The device that wants to be provisioned 130 sets up a provisioning access point (e.g., a software enabled access point, also known as a SoftAP) with a known broadcast identifier (e.g., a WiFi SSID, Bluetooth beacon, etc.) on a known radio channel. Once configurator 110 detects such a device 130, it establishes a connection 114 to the device. If using radio timedivision-multiplexing (TDM) of radio resources between the link 112 and the link 114, and pre-caching streaming data that will be needed while it communicates with the device 130, the configurator 110 may continue to support existing services while providing a pass-through to the credential storage in the cloud (e.g., a pass through for device 130 to communicate with server 140.

Using TDM, the configurator 110 can serialize connecting to the Internet (via 112) and connecting the device to be provisioned (via 114), repeatedly disconnecting and re-connecting to support both connections. If the configurator 110 has a separate connection to the network 199, the configurator 110 may similarly switch between a WiFi profile used for normal operations and a provisioning AP scanning mode used to service devices to be provisioned. This arrangement can also be performed in reverse, where the configurator 110 periodically switches to being a provisioning AP, and the devices to be provisioned (e.g., 130) scan for the appearance of the known broadcast identifier on the known radio channel, as the configurator 110 performs TDM to switch between its normal network operations and acting as the known provisioning AP.

Instead of TDM, the configurator 110 may use frequency-division multiplexing (FDM) to share wireless resources to maintain communications 112 with the access point 120 while searching for, detecting, and/or communicating with the device to be provisioned 130 (via radio link 112). As another alternative, the configurator 110 may use a first radio resource to communicate 112 with the access point 120 (e.g., WiFi) and a second radio resource to search for, detect, and/or communicate 114 with the device to be provisioned 130 (e.g., Bluetooth, WiFi-Direct).

Provisioning may include various types of information. In addition to network access point credentials (e.g., Wi-Fi credentials to connect to customer access point 120), provisioning may include configuration and customization settings such as language setting, may register the device to be provisioned with a user's cloud account, may initiate automatic application downloads to the device based on a user profile, may initiate firmware updates to the device, etc. When a user purchases a device online, they may be provided an option at the time of purchase as to whether they want the device automatically provisioned upon arrival or not.

Ordinarily, the configurator 110 may not perform provisioning AP scanning mode, doing so only after an event triggers that is should. For example, when the configurator 110 is associated with a user account (as indicated in user/device data storage 142 in the cloud), and a new device that will need provisioning information is purchased by the user, a backend device in the cloud (e.g., server 140) may "push" information to the configurator 110 as a trigger to begin periodically scanning for the new device 130 in anticipation of its presence. The backend device 140 may "push" a scan instruction to the configurator 110 based on, among other things, shipping delivery tracking information.

The configurator device 110 receives (172) a message from the server 140 to search for/detect a device 130 needing provisioning. The configurator 110 begins searching (174) for a device 130 for a device that needs provisioning while continuing to maintain other normal operation (e.g., streaming rendered video to television 118), using TDM, FDM, or separate radio resources for searching and normal operations. When it detects a device (e.g., 130a) that is emitting a known broadcast identifier on the expected channel, the configurator 110 establishes a radio link 114 to the device 130a, and relays (176) credentials received from the server 140 to the device 130a. The configurator 110 then continues (178) to periodically search for broadcast identifiers from additional devices (e.g., 130b, 130c) needing to be provisioned, until the server 140 sends a confirmation to the configurator 110 that the devices 130 that needed provisioning have been provisioned, which the configurator 110 may interpret as an indication to stop searching for broadcast identifiers from additional devices.

The configurator 110 may be an active participant in the provisioning process, or may acts as a pass-through relay. When acting as a pass-through relay, communications between the device 130a and the server 140 may be end-point-to-endpoint encrypted to reduce the possibility of credentials being intercepted by an unauthorized party. Among other things, secure communications between the device 130a and server 140 may use public-key/private-key encryption, digital certificates, and/or a stored secret. For example, the device 130a may store a "secret" such as a shared secret, or data encoded using the device's own private key or public key, and/or a digital certificate (which may be stored in a keystore, e.g., "secret storage" 674 in FIG. 6). "Secret data" may include data that is known to the device but not generally known, such as the secret itself and/or data encoded using the secret. Secret data may be known to the server 140 and/or verifiable by the server 140. For example, in a private key/public key situation, secret data may be encoded by the device 130a with the device's private key, where the resulting encoded data may be verified by the server 140 using the public key corresponding to the private key of device 130a. Likewise, the server 140 may store the shared secret, the device's public key, its own public and private key, and information to validate the device's digital certificate in a data locker in user device/data storage 142, in addition to storing a copy of the credentials to be provided to the device 130a.

If a device 130 is already operational and the access point (AP) 120 either changes credentials or a new AP is added, the device 130 may need to be re-provisioned. Once a device 130 determines that it is no longer able to connect to an AP 120, it may switch into provisioning AP mode and begin emitting the known broadcast identifier on the known channel, seeking new credentials. A change to the AP 120 and receipt of new credentials may trigger the configurator 110 to switch into configurator mode, periodically checking to for the known broadcast identifier on the known channel until all other devices belonging to the same account are provisioned (e.g., "smart" light bulb 130a, "smart" watch 130b, speech controlled appliance 130c, etc.). The cloud-based backend device 140 of all the devices, which are associated with a same account or group of accounts (e.g., associated with a family) in the user and device data 142.

From the user point-of-view, this approach to provisioning provides the appear that network-connected devices (e.g., 130a, 130b, 130c) work after they are powered up the first time, if in radio range of a configurator 110 and the device's registration is known. Either the configurator 110 or the backend server 140 may send the user/customer 10 a notification after each device is provisioned, such as sending an e-mail to the user/customer 10 or inserting a message onto a display of a device serviced by the configurator 110 (e.g., outputting a message to the television 118 to which the STB 110 is outputting the streaming video).

The use of known broadcast identifiers and specified channels facilitates the configurator 110 rapidly identifying if a device needing credentials is present. Using a known broadcast identifier and specified channels may shorten the time needed to establish communications between the configurator 110 and the device 130. If the configurator 110 is using TDM to allocate radio resources, this time reduction also may reduce the time the configurator 110 needs to divert radio resources away from other activities. Rather than having to scan multiple channels that might be available on the RAT, the configurator 110 may more quickly scan one or two channels for the known broadcast identifiers.

A consideration when provisioning a new device 130 is network security. While the configurator 110 can be configured to establish a secure connection to the device 130 needing provisioning, or to serve as a pass-through between the device 130 and the server 140, that does not assure that a device operating in provisioning AP mode using a known broadcast identifier on the known channel is necessarily a device that the configurator 110 should be provisioning. To prevent unauthorized devices from obtaining credentials simply by emitting a broadcast identifier for the configurator 110, the issuing of credentials is controlled, at least in part, by server 140, rather than unilaterally by the configurator 110. In particular, information related to a "secret" (i.e., protected data) held by the device to be provisioned 130 may be stored in the user/device data database 142.

As an alternative to or in addition to the configurator 110 receiving (172) a message from the server to search for/detect a device needing provisioning, a configurator 110 may periodically search (174) for/detect a device 130 that needs provisioning. If such a device 130 is detected in proximity to the configurator 110, the configurator 110 may establish communications with the device 130, and provide the device 130 a pass-through to the server 140, acting as a relay (176) as described above. The intervals between searching for/detecting devices 130 that need provisioning may be shorter (i.e., searching continually or more frequently) when the configurator 110 receives (172) receives a message from the server to search for/detect the device 130 than when the configurator 110 searches on its own without having received the message from the server. Likewise, after the server 140 sends a confirmation message to the configurator 110, which the configurator 110 may interpret as an indication to stop searching, the configurator 110 may instead lengthen the interval between searches, searching periodically or during breaks in normal operations (e.g., normal operations of a set-top box, mobile phone, tablet computer, or other device configured to serve as the configurator 110).

Figure 2A:
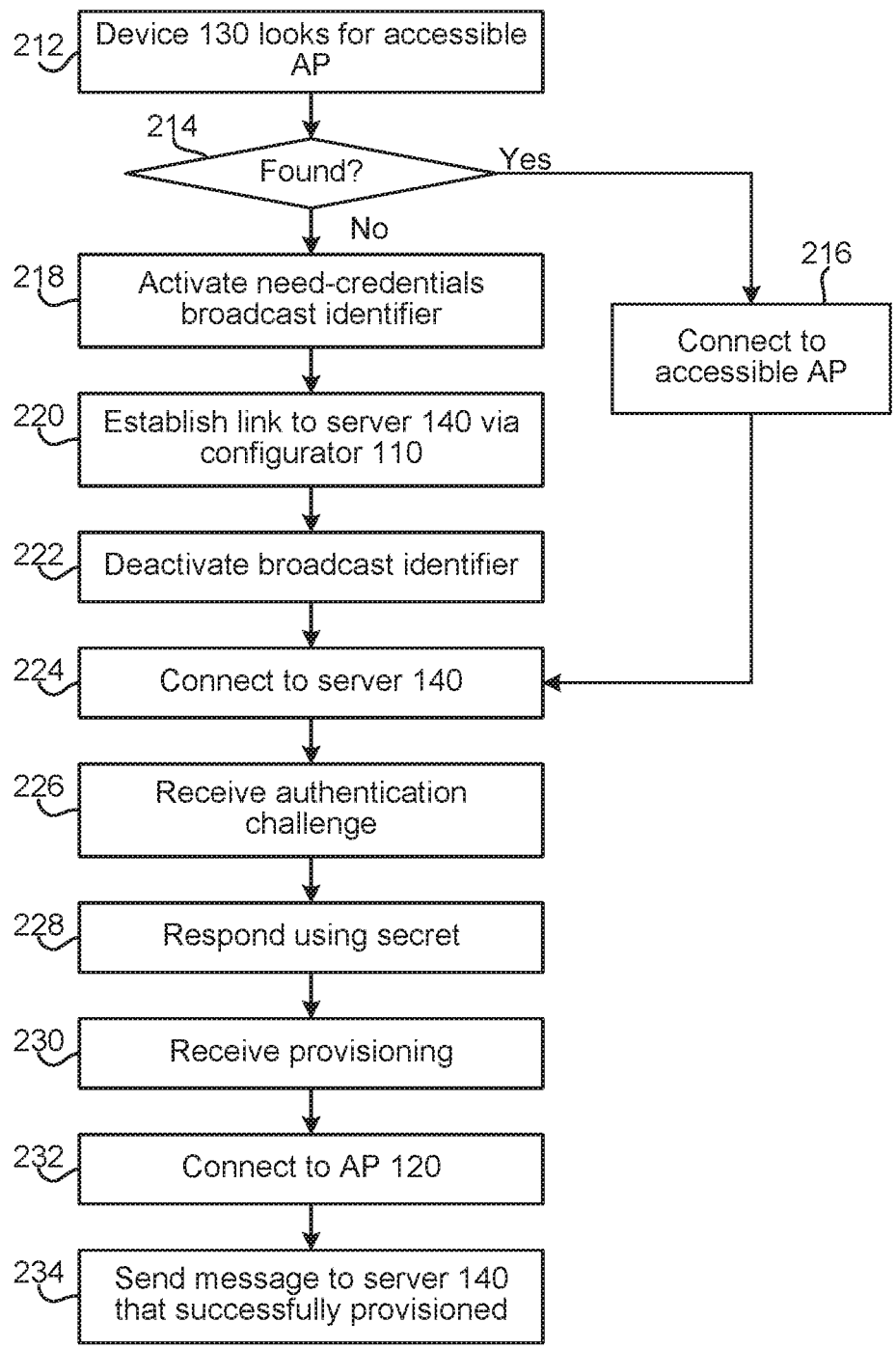
FIGS. 2A and 2B illustrate example operations of a device needing provisioning.

FIG. 2A illustrates an example of device operations when it is first turned on or loses access to customer AP 120. The device 130 first searches (212) for/detects an accessible access point. If an accessible access point is found (214 "Yes"), the device 130 connects (216) to the accessible access point, via which it connects (224) to the server 140. The accessible access point may be, for example, an open AP that does not require credentials. Even if the customer AP 120 is open (or provides open guest privileges) and is used as the accessible access point, the device 130 does not know whether the accessible access point (pre-provisioning) is the access point it should be using for future operations (post-provisioning), since the device does not know whether it is connected (216) to the customer's AP 120, a neighbor's open AP, a temporary SoftAP, etc.

The accessible AP that the device 130 may connect to (216) may be any open access point. Examples include the customer's AP 120 (if open), some other nearby open access point (e.g., a neighbors or a guess access point of the customer), a mobile access point carried by the delivery person delivering the device 130 to the customer, etc. The accessible access point may also be a secure (password-protected) access point to which the device 130 is afforded temporary privileges. For example, firmware of the device 130 may include credentials to temporarily connect to distributed secure access points operated as a commercial service, per an arrangement between the device provider and the commercial service (e.g., a cellular data service, an Internet service hotspot operator, an Internet service provider who's routers support guest access using a fixed SSID, a secure mobile hotspot operated by the delivery service delivering the device, etc.).

If the device 130 is unable to identify an accessible AP, the device 130 actives (218) its "need-credentials" broadcast identifier, using a firmware-specified broadcast identifier on a specified channel. After the configurator 110 responds, the device 130 establishes (220) a link to the server 140 via the configurator 110. The device 130 deactivates (222) its RF broadcast identifier and connects (224) to the server 140.

After connecting to the server 140, the device 130 receives (226) an authentication challenge. This challenge may be received from the server 140, or may be issued by the configurator 110 based on information received from the server 140. The device 130 responds (228) to the challenge request using its stored secret and/or digital certificate. If the stored secret is sent to the server 140, the device 130 may also encrypt the response to the challenge request using its public or private key. Thereafter, the device 130 receives (230) provisioning information. The device 130 then connects (232) to the customer AP 120 using credentials it received during provisioning, and sends (234) a message to the server 140 indicating that it was successfully provisioned.

Figure 2B:
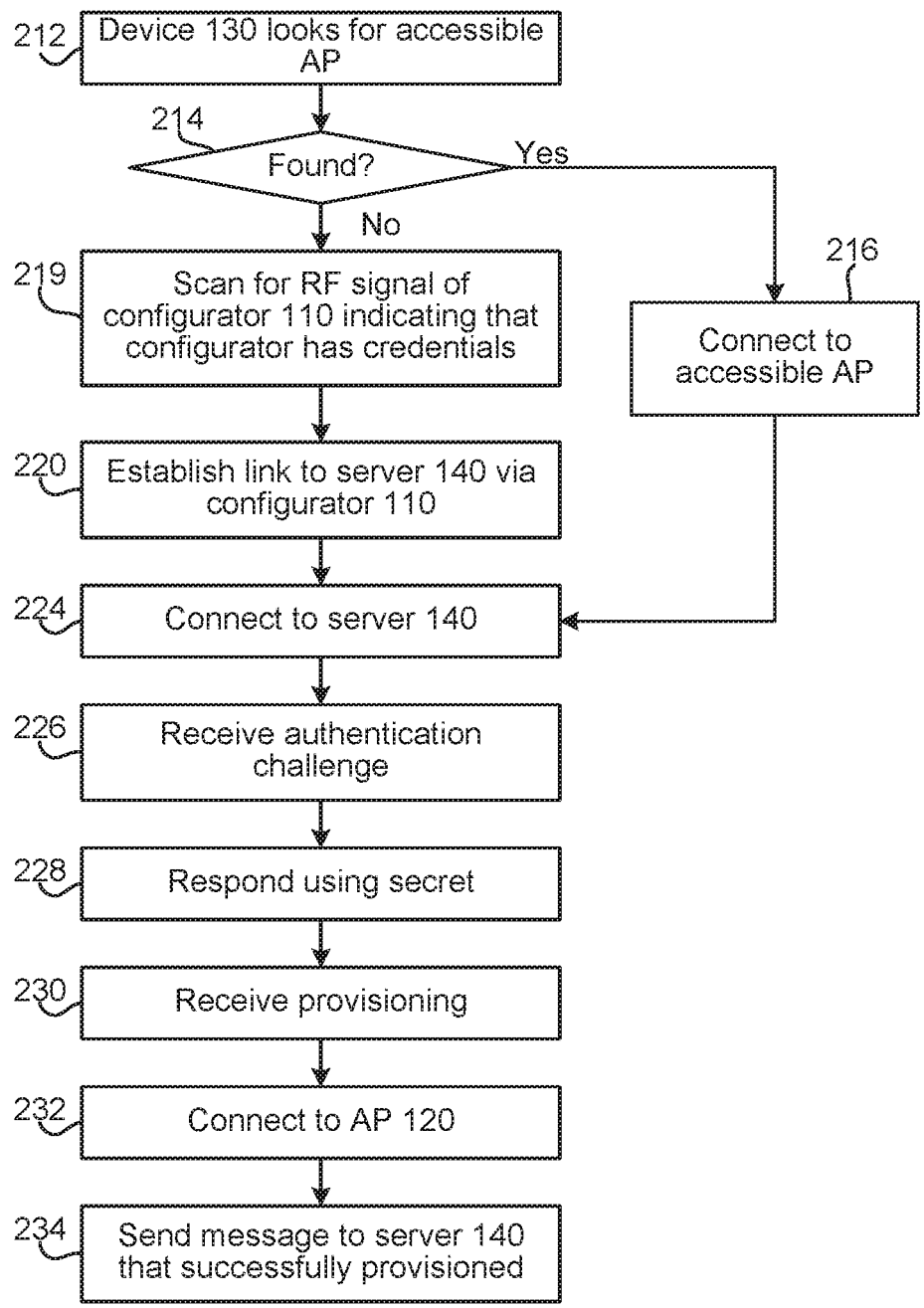

FIG. 2B illustrates another example of device operations when it is first turned on or loses access to customer AP 120. The device 130 first searches (212) for/detects an accessible access point (e.g., an open AP or a secure access point to which it has privileges). If an accessible access point is found (214 "Yes"), the device 130 connects (216) to the accessible access point, via which it connects (224) to the server 140. Otherwise, the device 130 scans (219) for a radio frequency (RF) signal indicating the a configurator has credentials (e.g., scan for a provisioning AP broadcast identifier) broadcast by the configurator 110, such as emitting an RF signal indicating a firmware-specified broadcast identifier on a specified channel. After the configurator 110 is, the device 130 establishes (220) a link to the server 140 via the configurator 110. The device 130 deactivates (222) its RF broadcast identifier and connects (224) to the server 140.

After connecting to the server 140, the device 130 receives (226) an authentication challenge. This challenge may be received from the server 140, or may be issued by the configurator 110 based on information received from the server 140. The device 130 responds (228) to the challenge request using its stored secret. Thereafter, the device 130 receives (230) provisioning information. The device 130 then connects (232) to the customer AP 120 using credentials it received during provisioning, and sends (234) a message to the server 140 indicating that it was successfully provisioned.

Although the password to the customer access point 120 could be shared with the server 140, stored in a password "locker" in storage 142, and distributed to the devices 130 from the cloud, an alternative is to maintain control over security in the cloud without requiring that the password for the customer access point 120 be disclosed to the server 140. In particular, the server 140 can authenticate a device 130 based on its secret, and then send the configurator 110 a token indicating that the device 130 is authorized to receive provisioning.

Figure 3A:
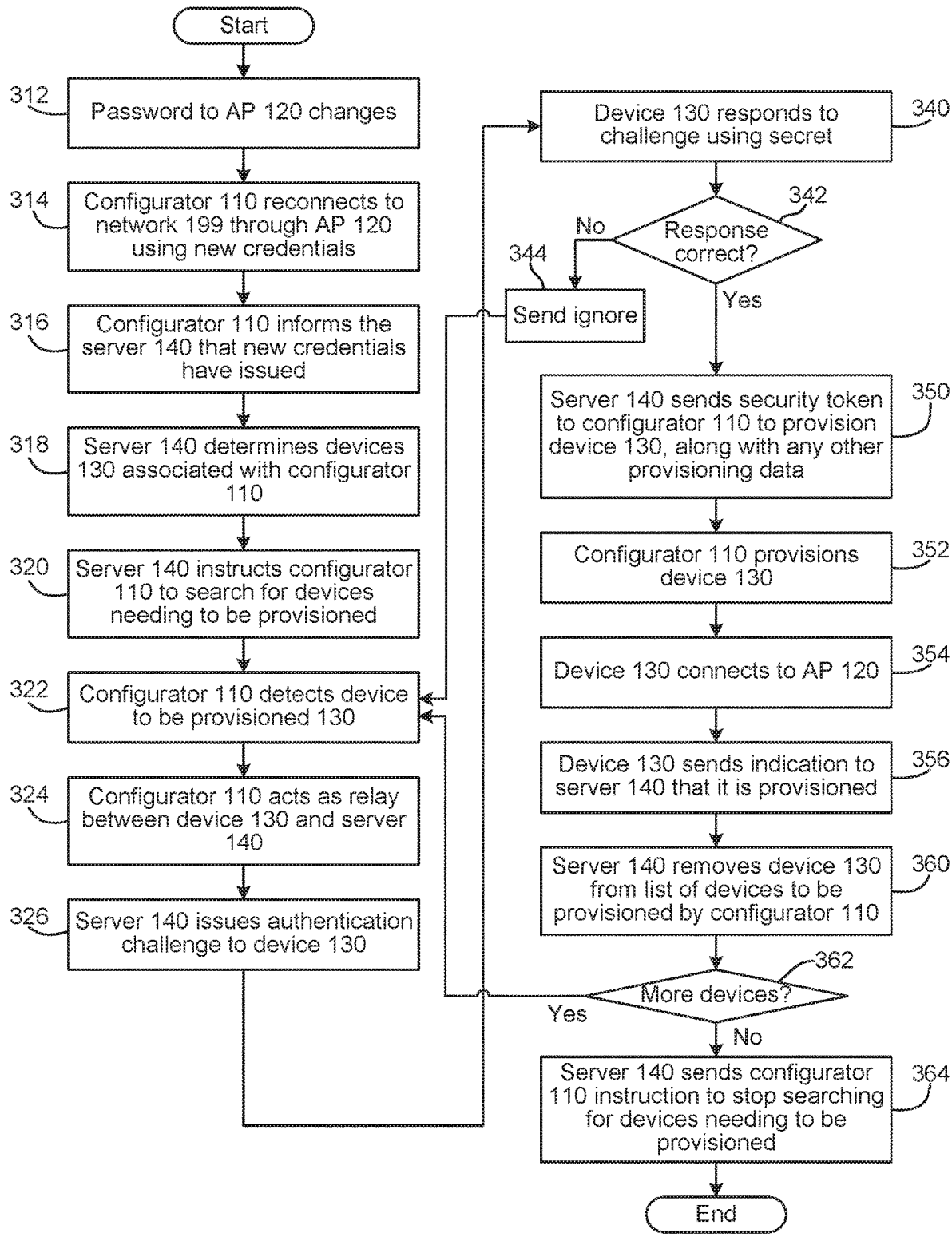
FIGS. 3A-3E illustrate an example of a process for provisioning of devices.

FIG. 3A is an example of a system process flow that is triggered when the credentials for the customer AP 120 change (312). This process flow may also be used if a new network is added to an existing network (e.g., another customer access point 120 is added). The configurator 110 reconnects (314) to the network 199 through the customer AP 120 using new credentials. The configurator 110 thereafter informs (316) the server 140 that new credentials have issued for the customer AP 120 (or that there are credentials for an additional customer AP 120). While the message from the configurator 110 indicates that the credentials have changed, it is not required that the configurator 110 share the new credentials with the server 140. In the alternative, a password "locker" may be used to store credentials for the customer AP 120 in the cloud (e.g., encrypted in the user/device data 142), in which case the server may store the new credentials to be distributed to the devices to be provisioned.

In response to the message indicating that the credentials have changed, the server 140 determines (318) that there are other credentialed devices 130 associated with the configurator 110, the customer AP 120, and/or an account associated with a user/customer 10 of the configurator 110. The server 140 keeps track of how many devices need to be synchronized as a result of the change of credentials. The server 140 instructs (320) the configurator 110 to search for/detect devices needing to be provisioned.

Thereafter, the configurator 110 detects (322) the broadcast identifier of a device to be provisioned 130. The configurator 110 acts (324) as a relay for communications between the device 130 and the server 140, or serves as the server's proxy. Either the server 140 issues (326) an authentication challenge to the device 130, or the configurator issues the challenge using information received from the server. The device 130 responds (340) to the challenge based on the secret it has stored in firmware. Either a symmetric secret (e.g., a security key or code known to both the device 130 and the server 140) or an asymmetric secret (e.g., public-key encryption, where the server holds the public key and the device holds the private key) may be used.

Depending upon (among other things) the computing power available on the configurator 110 and how the system is configured, the configurator may either act as a "dumb" pass-through to the cloud, simply buffering and relaying data packets back and forth between the server 140 and the device to be provisioned 130, or act as a "smart" peer-to-peer device that is actively engaged in authenticating the device. Operating as a pass-through, the configurator 110 may need to buffer the data packets back and forth between the server 140 and the device 130 as is alternates its radio resources between the radio link to the network 112 and the radio link to the device 130. If operating as a peer device, the configurator 110 may use a token received from the server 140 to validate/authenticate the secret received from the device to be provisioned 130.

A determination (342) is made by the configurator 110 or the server 140 as to whether the response was valid. If the server 140 authenticated the response and the response was not valid (342 "No"), a message may be sent (344) by the server 140 to the configurator 110 instructing it to ignore the device 130 that failed authentication. Otherwise, the server 140 sends (350) a security token to the configurator 110 authorizing the configurator 110 to provision the device 130. The server 140 may also send additional provisioning data, such as login credentials for the cloud account of the user/customer 10 associated with the configurator 110. After receiving the token, the configurator 110 provisions (352) the device 130. If instead the configurator 110 authenticated the response, and the server 140 has not already provided the configurator 110 with the additional provisioning data, then in response to the answer being valid (342 "Yes"), the configurator 110 may send a message to the server 140 that authentication has occurred, and the server 140 responding with the additional provisioning data.

After provisioning, using its new credentials, the device 130 connects (354) to the customer AP 120. The device 130 sends (356) a message to the server 140 confirming that it was provisioned. The server 140 removes (360) the device 130 from the list of devices that still need to be provisioned, based on the change in credentials. The server 140 then determines (362) whether there are more devices to be provisioned by the configurator 110. If there are more devices (362 "Yes"), the configurator 110 continues to search for/detect additional devices 130. Otherwise (362 "No"), the server 140 sends (364) the configurator 110 a confirmation message that the devices 130 have been provisioned. The configurator 110 may interpret the confirmation message as an instruction to stop searching for/detecting devices that need to be provisioned.

Figure 3B:
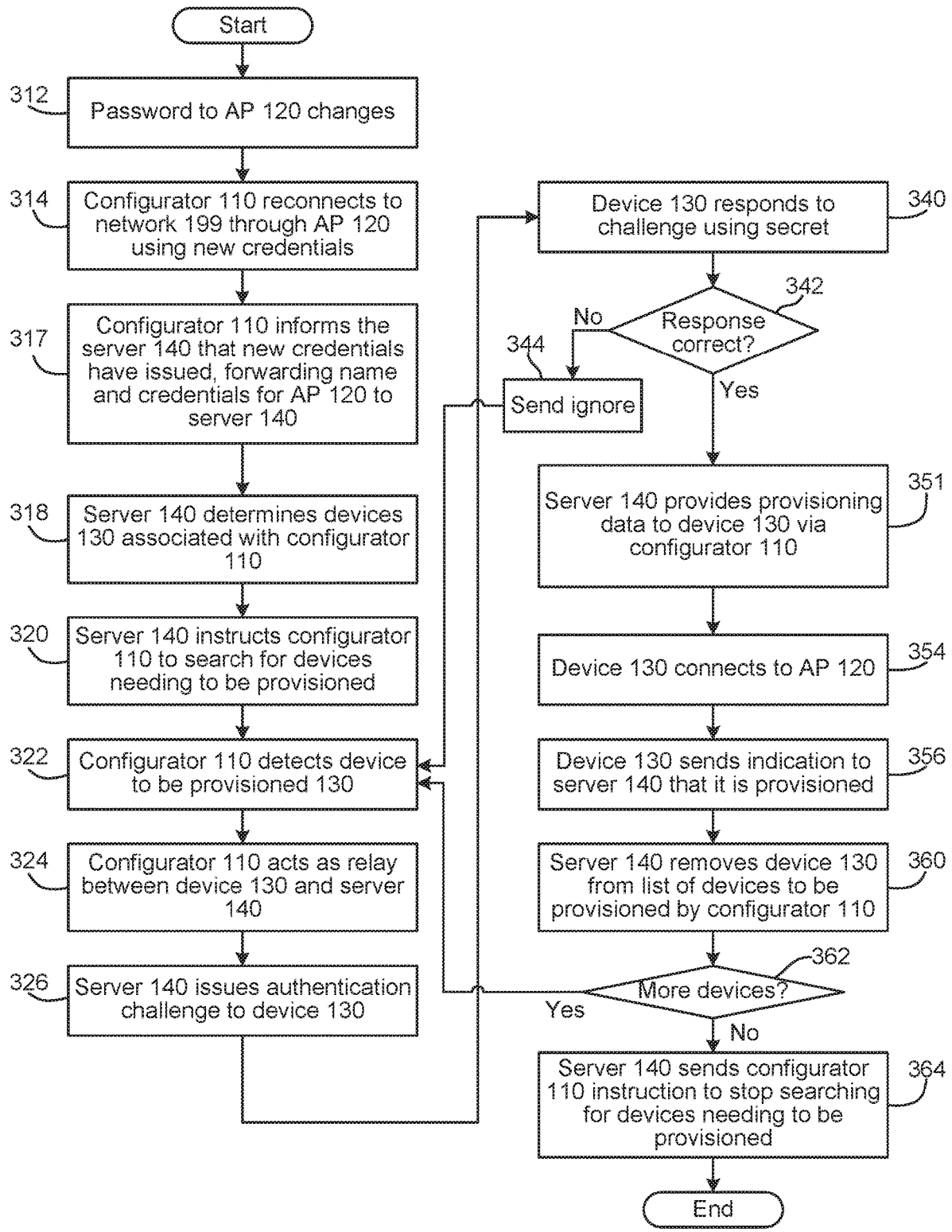

FIG. 3B is another example of a system process flow for provisioning devices. The process flow that is triggered when the credentials for the customer AP 120 change (312). However, instead of the configurator 110 storing the credentials for the customer AP 120, the configurator 110 forwards (317) the broadcast name and credentials for the customer AP 120 to the server 140, which the server 140 stores in a password locker (e.g., in storage 142). The server 140 provides (351) the provisioning data to the device 130 through the configurator 110, using the configurator 110 as a pass-through. The connection between the device 130 and the server 140 may be endpoint-to-endpoint encrypted, such as by using encryption keys associated with the device 130 which may be stored by the server 140 and/or the device 130.

Figure 3C:
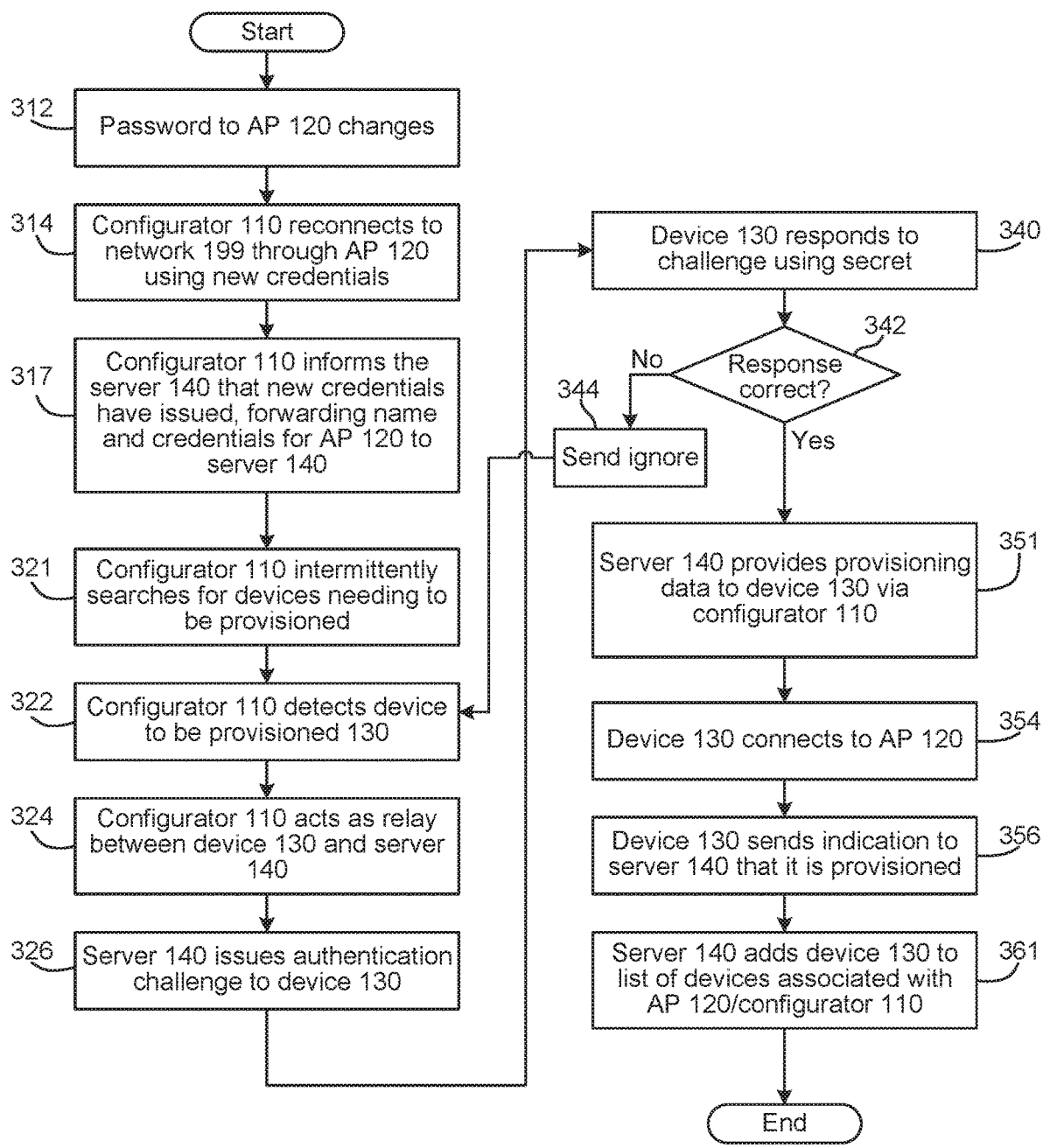

FIG. 3C is another example of a system process flow for provisioning devices. In this example, the configurator 110 intermittently searches (321) for/detects devices that need to be provisioned, without having been prompted to do so by the server 140. When a device 130 needing to be provisioned is detected, the server 140 provisions the device 130 as discussed with FIG. 3B. After the device 130 sends (356) the indication to the server confirming that it has successfully been provisioned, the server 140 adds (361) the device to the list of devices associated with the configurator 110, the customer AP 120, and/or the customer's account. The process flow in FIG. 3C uses the password locker for provisioning by the server 140, as described in FIG. 3B. However, this process flow may instead use the tokening approach discussed in connection with FIG. 3A, where the server 140 sends (350) the security token to the configurator 110, indicating to the configurator 110 that it should provision the device 130.

Figure 3D:
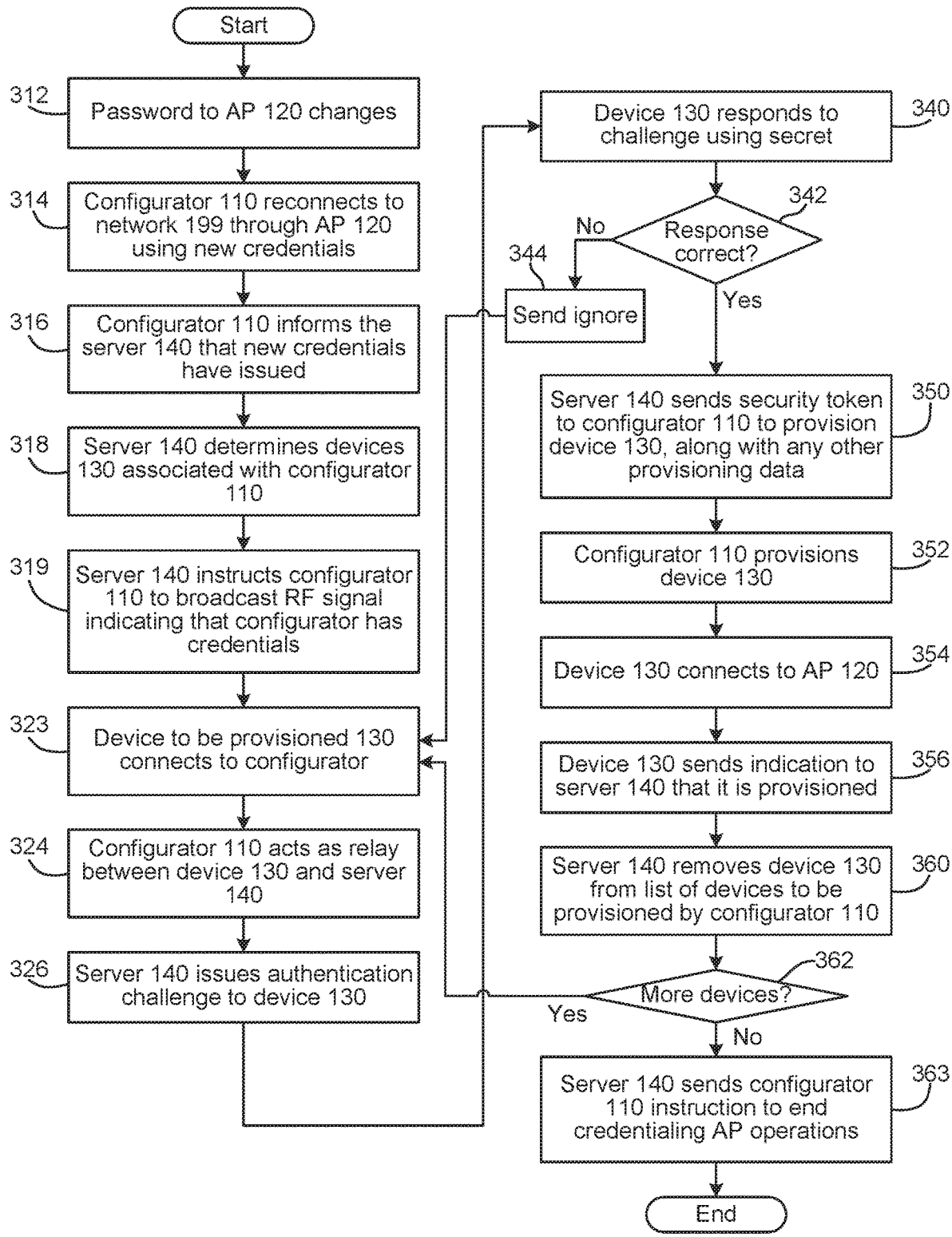

FIG. 3D is another example of a system process flow for provisioning a device. This process flow is triggered when the credentials for the customer AP 120 change (312). This process flow may also be used if a new network is added to an existing network (e.g., another customer access point 120 is added). The configurator 110 reconnects (314) to the network 199 through the customer AP 120 using new credentials. The configurator 110 thereafter informs (316) the server 140 that new credentials have issued for the customer AP 120 (or that there are credentials for an additional customer AP 120). While the message from the configurator 110 indicates that the credentials have changed, it is not required that the configurator 110 share the new credentials with the server 140. In the alternative, as discussed with FIG. 3B, a password "locker" may be used to store credentials for the customer AP 120 in the cloud (e.g., encrypted in the user/device data 142), in which case the server may store the new credentials to be distributed to the devices to be provisioned.

In response to the message indicating that the credentials have changed, the server 140 determines (318) that there were other credentialed devices 130 associated with the configurator 110, the customer AP 120, and/or an account associated with a user/customer 10 of the configurator 110. The server 140 keeps track of how many devices need to be synchronized as a result of the change of credentials. The server 140 instructs (319) the configurator 110 to begin periodically emitting an RF signal indicating that the configurator 110 has credentials (e.g., a provisioning AP broadcast identifier) for the benefit of nearby devices that need to be provisioned 130. The RF signal frequency, protocol, and the broadcast identifier that is to be emitted may be specified in the configurator's firmware.

Thereafter, a device to be provisioned 130 detects the configurator's RF signal indicating that the configurator 110 has credentials and established a connection 114 to the configurator's provisioning AP. While the link 114 between the configurator 110 and the device to be provisioned 130 is active, the configurator may optionally deactivate emission of the broadcast identifier, reestablishing the broadcast identifier emission after the link 114 is torn down. This simplifies operation provisioning AP operation by allowing the configurator to deal with devices to be provisioned one-at-a-time, with devices that need to be provisioned handled on a first-to-connect basis.

The configurator 110 acts (324) as a relay for communications between the device 130 and the server 140, or serves as the server's proxy. Either the server 140 issues (326) an authentication challenge to the device 130, or the configurator issues the challenge using information received from the server. The device 130 responds (340) to the challenge based on the secret it has stored in firmware. Either a symmetric secret (e.g., a security key or code known to both the device 130 and the server 140) or an asymmetric secret (e.g., public-key encryption, where the server holds the public key and the device holds the private key) may be used.

Depending upon (among other things) the computing power available on the configurator 110 and how the system is configured, the configurator may either act as a "dumb" pass-through to the cloud, simply buffering and relaying data packets back and forth between the server 140 and the device to be provisioned 130, or act as a "smart" peer-to-peer device that is actively engaged in authenticating the device. Operating as a pass-through, the configurator 110 may need to buffer the data packets back and forth between the server 140 and the device 130 as is alternates its radio resources between the radio link to the network 112 and the radio link to the device 130. If operating as a peer device, the configurator 110 may use a token received from the server 140 to validate/authenticate the secret received from the device to be provisioned 130.

A determination (342) is made by the configurator 110 or the server 140 as to whether the response was valid. If the server 140 authenticated the response and the response was not valid (342 "No"), a message may be sent (344) by the server 140 to the configurator 110 instructing it to ignore the device 130 that failed authentication. Otherwise, the server 140 sends (350) a security token to the configurator 110 authorizing the configurator 110 to provision the device 130. The server 140 may also send additional provisioning data, such as login credentials for the cloud account of the user/customer 10 associated with the configurator 110. After receiving the token, the configurator 110 provisions (352) the device 130. If instead the configurator 110 authenticated the response, and the server 140 has not already provided the configurator 110 with the additional provisioning data, then in response to the answer being valid (342 "Yes"), the configurator 110 may send a message to the server 140 that authentication has occurred, and the server 140 responding with the additional provisioning data.

After provisioning, using its new credentials, the device 130 connects (354) to the customer AP 120. The device 130 sends (356) a message to the server 140 confirming that it was provisioned. The server 140 removes (360) the device 130 from the list of devices that still need to be provisioned, based on the change in credentials. The server 140 then determines (362) whether there are more devices to be provisioned by the configurator 110. If there are more devices (362 "Yes"), the configurator 110 continues to search for/detect additional devices 130. Otherwise (362 "No"), the server 140 sends (363) the configurator 110 an instruction to end provisioning AP operations.

Figure 3E:
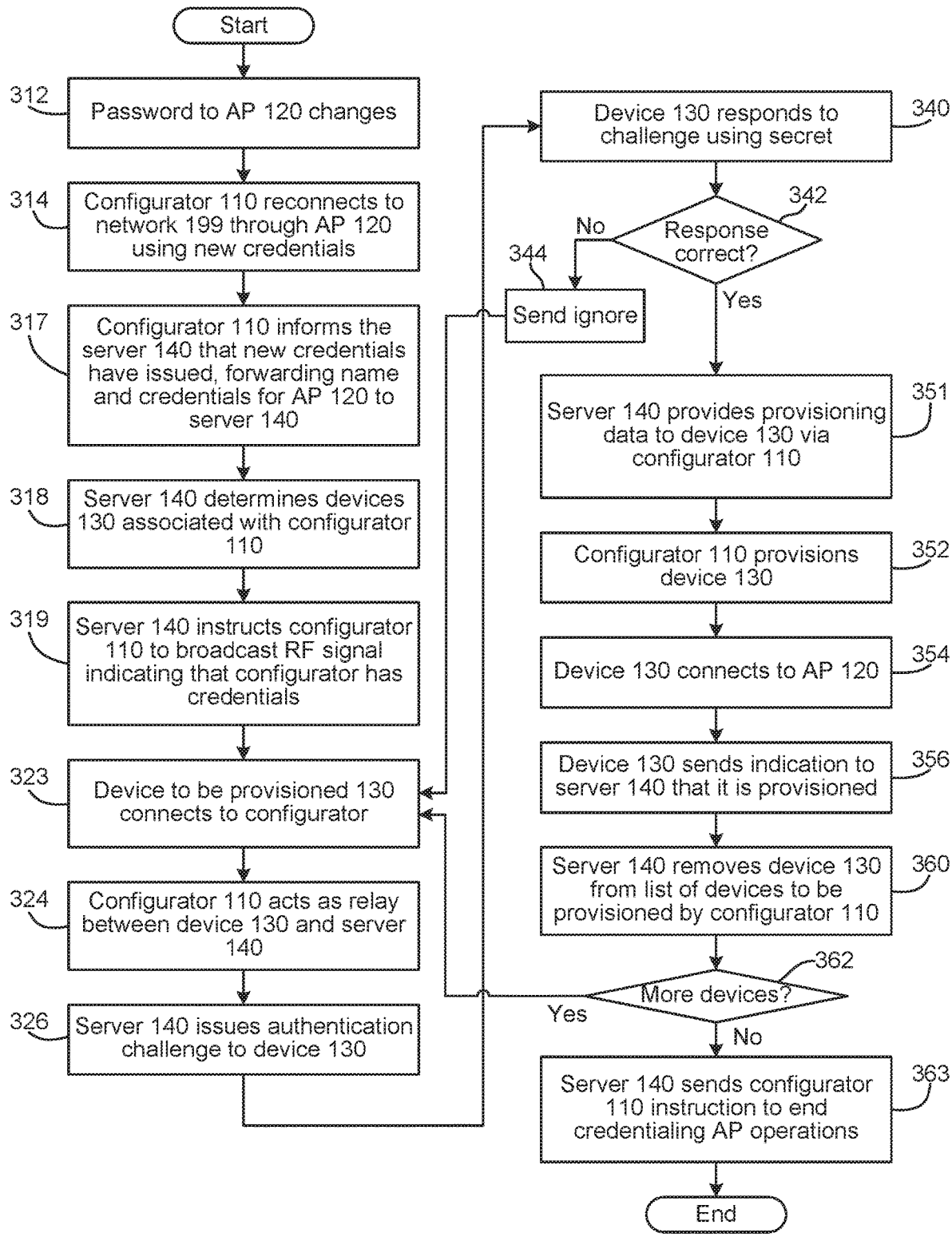

FIG. 3E is a version of a system process flow in FIG. 3D, modified to use the password locker in the cloud, as discussed for example in connection with FIG. 3B. The process flows in FIGS. 3D and 3E may also be modified based on FIG. 3C, where the configurator intermittently (or continuously) searches (321) for devices needing to be provisioned 130, with the server 140 thereafter adding (361) the device 130 to the list of devices associated with the configurator 110, customer AP 130, and/or customer account.

Figure 4A:
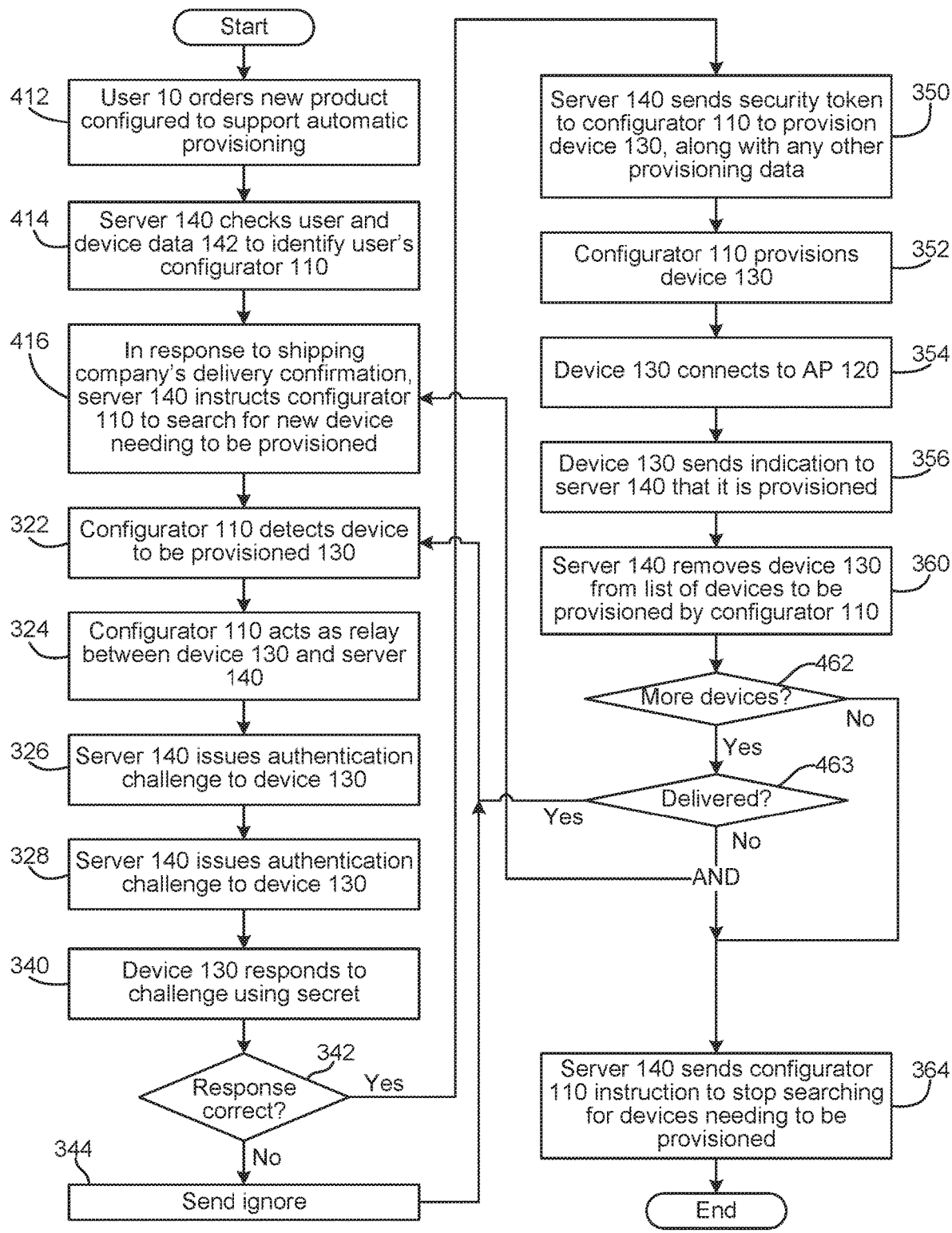
FIGS. 4A-4D illustrate an example of a process where the cloud-based service triggers provisioning of a newly shipped device by a device at its destination.

FIG. 4A is an example of a system process flow that is triggered when the user/customer 10 orders (412) a new product that is configured to support automatic provisioning. The server 140 checks (414) user and device data 142 to identify the user's configurator 110. In response to a shipping company's electronic delivery confirmation that the new package has been delivered, and/or based on the estimated date of delivery provided by a shipping company's computer system, the server 140 instructs (416) the configurator 110 to search for/detect the new device needing to be provisioned.

For example, a product sales computer system (e.g., 797 in FIG. 7) determines that a product that a user has purchased will require provisioning, signaling the server 140. The server 140 determines that a configurator 110 is associated with the user's account, based on information in the user/device database 142. The server 140 thereafter obtains delivery information from a package tracking system (e.g., 798 in FIG. 7). The package tracking system may provide the server 140 actual or estimated delivery information such as information based upon data from a delivery person's remote handheld package scanner indicating that the package has been delivered, or based on an estimated time of delivery, or based on the package being out for delivery.

In response, the configurator 110 begins periodically searching for/detecting the specified broadcast identifier on the specified channel, until the configurator 110 detects (322) the broadcast identifier of the device to be provisioned 130. The configurator 110 acts (324) as a relay for communications between the device 130 and the server 140, or serves as the server's proxy. The server 140 issues (326) an authentication challenge to the device 130. The device 130 responds (340) to the challenge based on the secret it has stored in firmware.

A determination (342) is then made by the configurator 110 or the server 140 as to whether the response was valid. If the response was not valid (342 "No"), a message may be sent (344) by the server 140 to the configurator 110 instructing it to ignore the device 130 that failed authentication. Otherwise, the server 140 sends (350) a security token to the configurator 110 authorizing the configurator 110 to provision the device 130. The server 140 may also send additional provisioning data, such as login credentials for the cloud account of the user/customer 10 associated with the configurator 110. After receiving the token, the configurator 110 provisions (352) the device 130.

Using its new credentials, the device 130 connects (354) to the customer AP 120. The device 130 sends (356) a message to the server 140 confirming that it was provisioned. The server 140 removes (360) the device 130 from the list of devices that still need to be provisioned, based on the change in credentials. The server 140 then determines (462) whether there are more devices to be provisioned by the configurator 110. If not (362 "No"), the server 140 sends (364) the configurator 110 a confirmation message indicating that the devices 130 have been provisioned, which the configurator 110 may interpret as an instruction to stop searching for/detecting devices that need to be provisioned. Otherwise, if there are still devices to be provisioned (462 "Yes"), the server 140 checks (463) whether any of the devices remaining to be provisioned have been delivered. If they have been delivered (463 "Yes"), the configurator 110 continues to search for/detect additional devices 130. Otherwise, if the additional devices have not yet been delivered (463 "No"), the server sends (364) the configurator 110 the confirmation message. In response to the confirmation message, the configurator 110 may stop searching for/detecting devices that need to be provisioned and returns to waiting for delivery information indicating that the additional devices have been delivered (or are expected to be delivered).

Figure 4B:
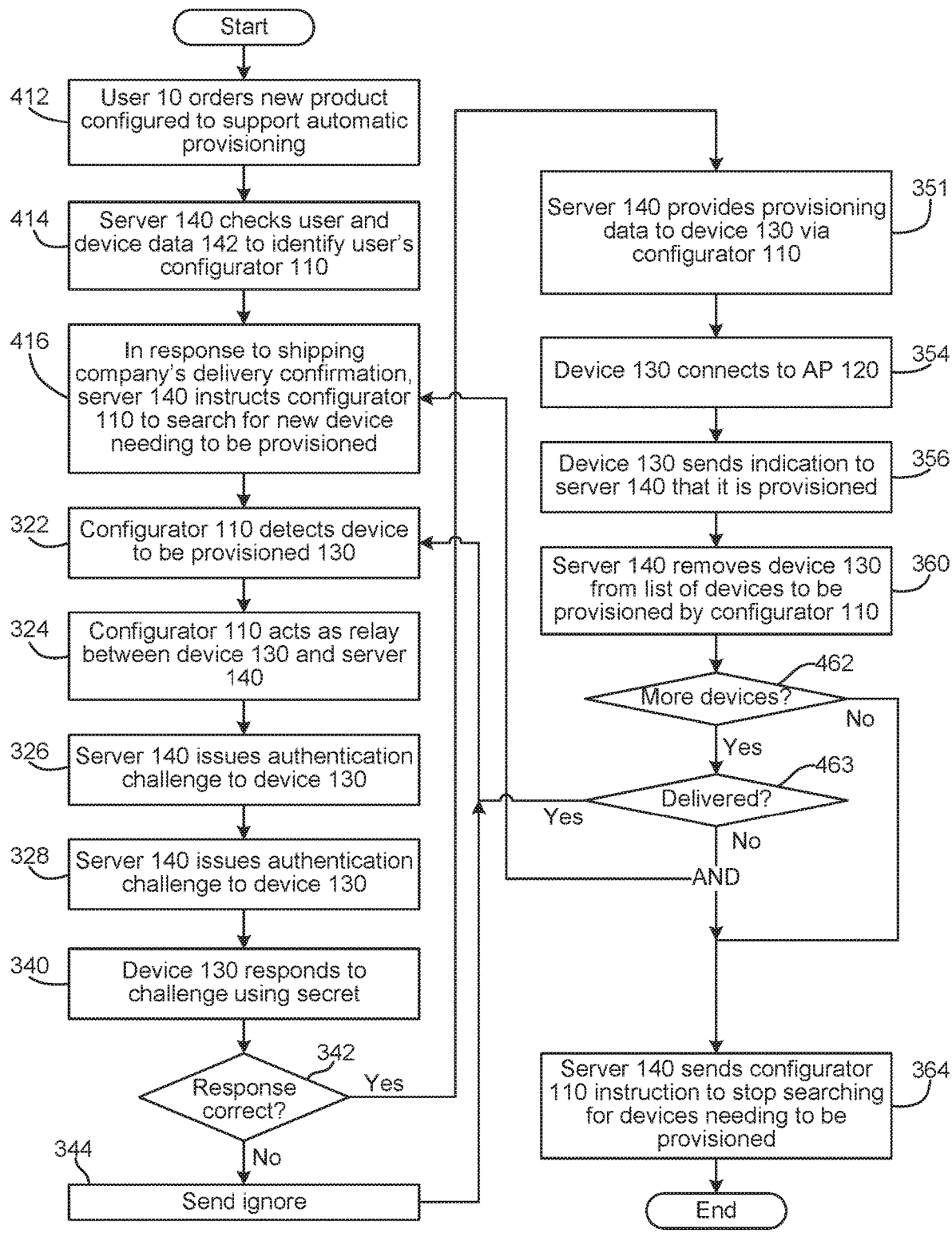

FIG. 4B is another example of a system process flow that is triggered when the user/customer 10 orders (412) a new product that is configured to support automatic provisioning. However, instead of the configurator 110 storing the credentials for the customer AP 120 and releasing them to the device 130 in response to receiving (350) a security token from the server, the server 140 stores in a password locker (e.g., in storage 142) and provides (351) the provisioning data to the device 130 through the configurator 110, using the configurator 110 as a pass-through. The connection between the device 130 and the server 140 may be endpoint-to-endpoint encrypted, such as by using encryption keys associated with the device 130 which may be stored by the server 140 and/or the device 130.

Figure 4C:
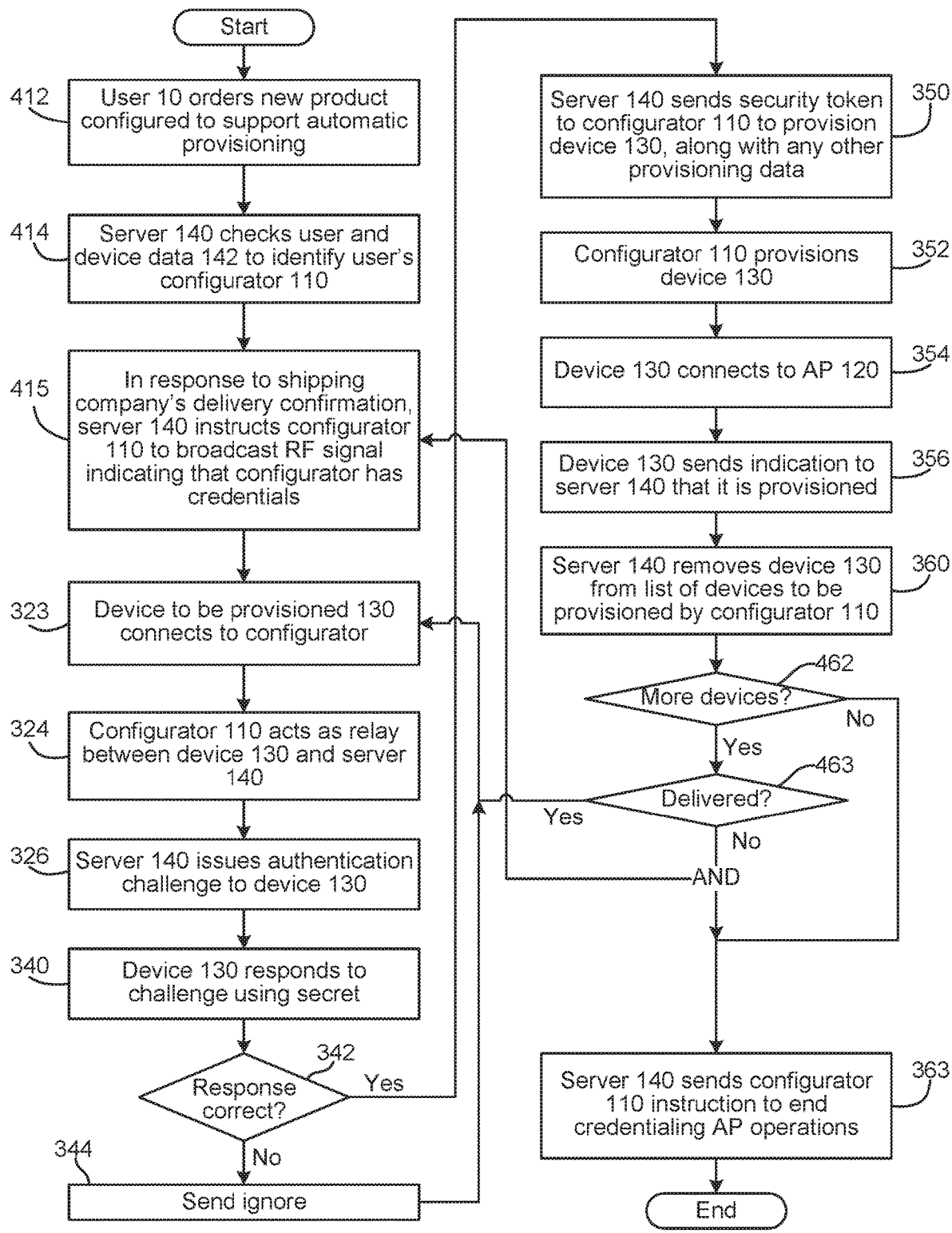

FIG. 4C is another example of a system process flow that is triggered when the user/customer 10 orders (412) a new product that is configured to support automatic provisioning. The server 140 checks (414) user and device data 142 to identify the user's configurator 110. In response to a shipping company's electronic delivery confirmation that the new package has been delivered, and/or based on the estimated date of delivery provided by a shipping company's computer system, the server 140 instructs (415) the configurator 110 to enter a periodic provisioning AP mode, emitting a specified broadcast identifier signal to be detected by the devices to be provisioned 130. In response, the configurator 110 begins periodically emitting the provisioning AP broadcast identifier on the specified channel, until a device that needs to be provisioned 130 establishes (323) a connection to the configurator 110. The configurator 110 acts (324) as a relay for communications between the device 130 and the server 140, or serves as the server's proxy. The server 140 issues (326) an authentication challenge to the device 130. The device 130 responds (340) to the challenge based on the secret it has stored in firmware.

A determination (342) is then made by the configurator 110 or the server 140 as to whether the response was valid. If the response was not valid (342 "No"), a message may be sent (344) by the server 140 to the configurator 110 instructing it to ignore the device 130 that failed authentication. Otherwise, the server 140 sends (350) a security token to the configurator 110 authorizing the configurator 110 to provision the device 130. The server 140 may also send additional provisioning data, such as login credentials for the cloud account of the user/customer 10 associated with the configurator 110. After receiving the token, the configurator 110 provisions (352) the device 130.

Using its new credentials, the device 130 connects (354) to the customer AP 120. The device 130 sends (356) a message to the server 140 confirming that it was provisioned. The server 140 removes (360) the device 130 from the list of devices that still need to be provisioned, based on the change in credentials. The server 140 then determines (462) whether there are more devices to be provisioned by the configurator 110. If not (362 "No"), the server 140 sends (363) the configurator 110 an instruction to end soft AP operations.

Otherwise, if there are still devices to be provisioned (462 "Yes"), the server 140 checks (463) whether any of the devices remaining to be provisioned have been delivered. If they have been delivered (463 "Yes"), the configurator 110 continues to emit its provisioning AP broadcast identifier (or reactivate the provisioning AP broadcast identifier if it was suspended for the duration of the link 114 to the prior device that was provisioned). Otherwise, if the additional devices have not yet been delivered (463 "No"), the server sends (363) the configurator 110 an instruction to end provisioning AP operations and returns to waiting for delivery information indicating that the additional devices have been delivered (or are expected to be delivered).

Figure 4D:
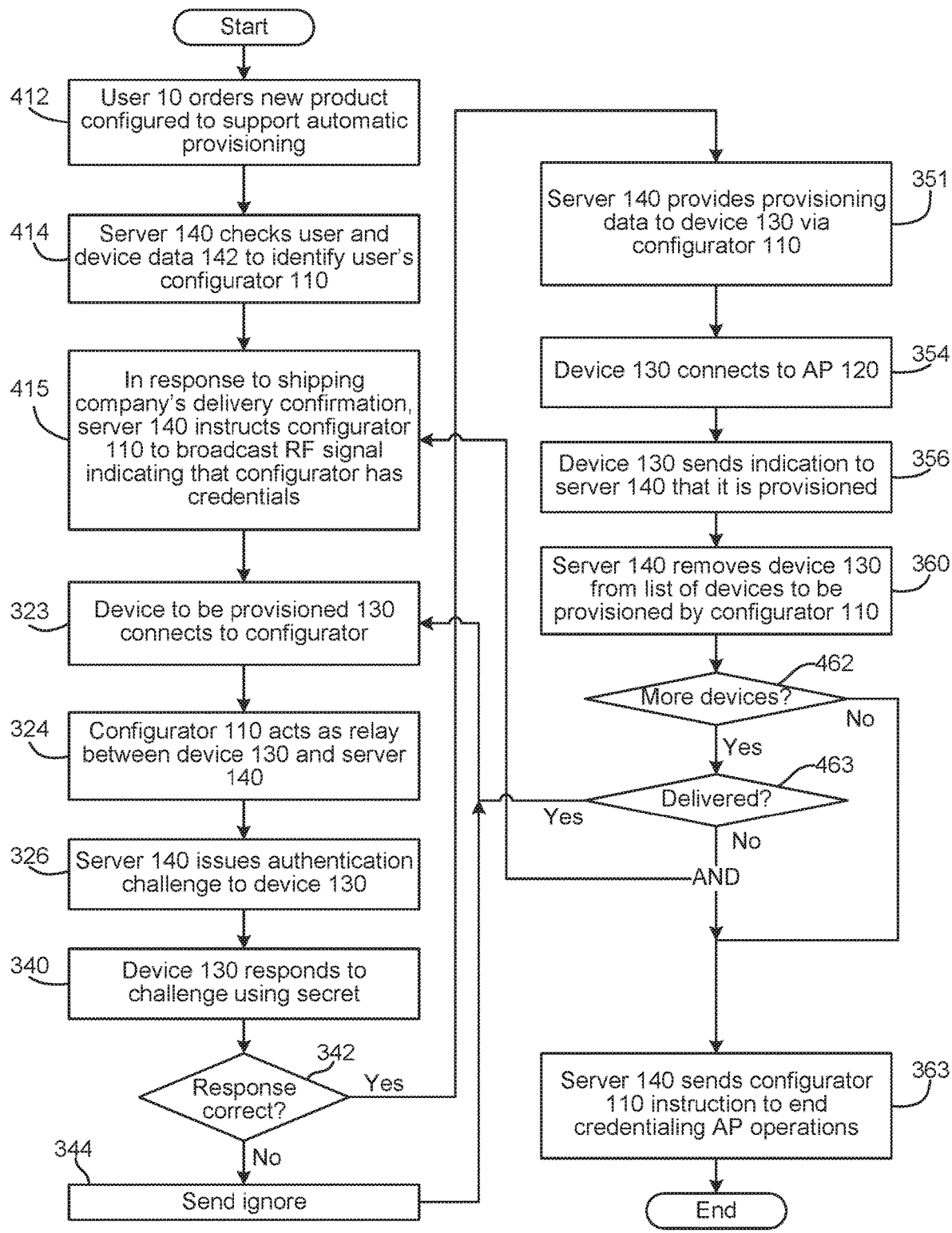

FIG. 4D is another example of a system process flow similar to FIG. 4C, where the process flow is triggered when the user/customer 10 orders (412) a new product that is configured to support automatic provisioning. However, instead of the configurator 110 storing the credentials for the customer AP 120 and releasing them to the device 130 in response to receiving (350) a security token from the server, the server 140 stores in a password locker (e.g., in storage 142) and provides (351) the provisioning data to the device 130 through the configurator 110, using the configurator 110 as a pass-through. The connection between the device 130 and the server 140 may be endpoint-to-endpoint encrypted, such as by using encryption keys associated with the device 130 which may be stored by the server 140 and/or the device 130.

FIG. 5 is a block diagram conceptually illustrating example components of the streaming media player 110 that is used as an example configurator 110. Although demonstrated with a streaming media player, any network connected computing device may be used as the configurator. In operation, the configurator 110 may include computer-readable and computer-executable instructions that reside on the configurator 110, as will be discussed further below.

As illustrated in FIG. 5, the streaming media player 110 may be an input-limited device, such as a device that can receive basic inputs (e.g., up-down-left-right-enter) from a remote control 106, but lacks more conventional rich user input capabilities, such as a keyboard and/or a touch screen able to accept direct single-keystroke entry of text, instead receiving credentials for the customer AP 120 using a virtual on-screen (i.e., on television 118) keyboard.

The player 110 includes input/output (I/O) device interfaces 502, which provide the player 110 with connectivity and protocol support. A variety of input and output connections may be made through the input/output device interfaces 502. For example, an infrared photodiode 512 may be used to receive control signals from remote control 106. An RF antenna 514 may be used to provide (wireless local area network) WLAN connectivity to the customer AP 120. The same RF antenna 514 or another antenna 514 may be used for the radio link 114 to the devices to be provisioned 130.

A variety of protocols may be supported by the I/O device interfaces 502 for the link 114 to the device to be provisioned 130, and the protocol/radio access technology used by the configurator 110 to communicate with the devices to be provisioned 130 and with the customer AP 120 may be different. For example, the radio link 112 may be a WLAN link (e.g., WiFi), while the radio link 114 may be a WLAN link (e.g., WiFi or WiFi Direct) or a personal area network (PAN) link.

Although typically slower than WLAN, many devices support wireless personal area networks (PAN), with a range typically on an order of a few centimeters up to a few meters. Among other applications, PANs are used for device-to-device communications and home automation. Examples of PAN technologies include wireless USB (universal serial bus), Bluetooth, Z-Wave (a home automation radio technology), and ZigBee (i.e., the IEEE 802.15.4 standards). In comparison, a wireless local area network (WLAN) is typically used to provide access to a larger network, such as the Internet, with a range typically on an order of tens to hundreds of meters. Another protocol that may be used for the radio link 114 is Near Field Communication (NFC) using an NFC antenna (not illustrated).

As an alternative, instead of using a radio frequency (RF) interface for the link 114 to the devices to be provisioned 130, the link 114 may be based on another technology, such as ultrasonic communication or infrared communication (e.g., IrDA, which is another PAN technology). Likewise, as an alternative to using an infrared photodiode 512 to receive signals from the remote control 106, the I/O device interfaces 502 may support receiving RF or an ultrasonic from the remote control 106. Also, either in addition to or as an alternative to the RF antenna 514 servicing the WLAN link 112 to the customer AP 120, the I/O device interfaces 502 may support a wired connection such as Ethernet by which the configurator 110 connects to network 199 via the customer AP 120.

The input/output device interfaces 502 may support an audio/video (A/V) output used to convey user interfaces and media to a connected television 118 or monitor. The A/V output may be a wired connection (as illustrated) or wireless connection (i.e., RF). An example of a wired protocol that may be supported by the I/O device interfaces 502 for A/V output includes High-Definition Multimedia Interface (HDMI). Examples of wireless A/V output connections that may be supported by the I/O device interfaces 502 include Wireless Home Digital Interface (WHDI) and Miracast.

The input/output device interfaces 502 may also support other types of connections and communications protocols. For example, the player 110 may also include an interface for an external peripheral device connection such as universal serial bus (USB), FireWire, Thunderbolt or other wired connection protocol.

The I/O device interfaces 502 may also support other wireless connection protocols in addition to WLAN (e.g., WiFi, WiFi Direct), PAN (e.g., Bluetooth, IrDA), and/or NFC. For example, Instead of or in addition to WLAN, PAN, NFC and/or Ethernet, either the link 112 and/or the link 114 may be replaced or supplemented with some other type of network communication support, such as cellular data communications related to a Long Term Evolution (LTE) network, WiMAX network, CDMA network, GSM network, etc. For example, the configurator 110 may support WLAN, PAN, NFC, and/or cellular connectivity (e.g., if a "smart" telephone or tablet computer is used as the configurator 110), whereas the devices to be provisioned (e.g., 130*a*, 130*b*, 130*c*) may support WLAN, PAN, or NFC. Likewise, the devices to be provisioned (e.g., 130*a*, 130*b*, 130*c*) may support WLAN, PAN, NFC, and/or cellular connectivity (e.g., enabling the use of a cell tower as the accessible AP in 216), whereas the configurator may support WLAN, PAN, and/or NFC. Also, different devices to be provisioned may support different protocols, such as one device 130 supporting Bluetooth, and another supporting WiFi. When the server 140 instructs the configurator 110 to provision the devices 130, it may also communicate which protocols should be used/activated.

The player 110 may include an address/data bus 524 for conveying data among components of the player 110. Each component within the player 110 may also be directly connected to other components in addition to (or instead of) being connected to other components across the bus 524.

The player 110 may include one or more controllers/processors 504, that may each include a central processing unit (CPU) for processing data and computer-readable instructions, and a memory 506 for storing data and instructions. The memory 506 may include volatile random access memory (RAM), non-volatile read only memory (ROM), non-volatile RAM (e.g., magnetoresistive RAM) and/or other types of memory. The player 110 may also include a data storage component 508, for storing data and controller/processor-executable instructions (e.g., instructions to perform the process steps performed by the configurator 110 in FIGS. 1, 2A, 2B, 3A-3E, and 4A-4D). The data storage component 508 may include one or more non-volatile storage types such as magnetic storage, optical storage, solid-state storage, etc. The player 110 may also be connected to removable or external non-volatile memory and/or storage (such as a removable memory card, memory key drive, etc.) through the input/output device interfaces 502.

Computer instructions for operating the player 110 and its various components may be executed by the controller(s)/processor(s) 504, using the memory 506 as temporary "working" storage at runtime. The computer instructions may be stored in a non-transitory manner in non-volatile memory 506, storage 508, or an external device. Alternatively, some or all of the executable instructions may be embedded in hardware or firmware in addition to or instead of software.

The player 110 further includes a streaming media module 530. The streaming media module 530 includes a streaming module connectivity engine 532 and a streaming media decoder 534. The streaming media module 530 operates in a conventional fashion, with the exception that the streaming connectivity engine 532 may increase the rate at which media is buffered in the streaming media buffer 536 when the player 110 is operating at the configurator 110, switching radio resources between the link 112 to the network and searching for/detecting broadcast identifier signals from the devices to be provisioned, and switching between the link 112 to the network and the link 114 to a device to be provisioned 130. The streaming media decoder 534 renders the data stored in the streaming media buffer 536, to be output to the display (e.g., television 118). The increase in rate enables the streaming media module 530 to download extra data while the link 112 is active in order to maintain smooth video playback when the link 112 is inactive (i.e., while the radio resources are used to scan or link to devices for provisioning). The increase in the data rate may be based in part on the duration of the intervals used to scan for and/or communicate with the devices to be provisioned (e.g., intervals in tenths-of-seconds), and may be coordinated with the streaming media service (e.g., depending upon streaming buffering and rate protocols, whether the streaming services is affiliated with the provisioning service supported by server 140, etc.).

The configurator controller 540 includes a cloud coordinator 542 that may be, for example, a state machine, which initiates the sending of a message to the cloud service (e.g., server 140) after credentials change, activates and deactivates search for devices to be provisioned when instructed to do so by the cloud service, activates the credentials provisioner 552 upon receipt of a validation token from the cloud service, etc. The cloud coordinator 542 switches between a series of operational states, such as normal operation when media player is not actively acting as the configurator 540, an event-to-uplink state that occurs when new credentials are input, and the configurator state that occurs when the cloud service instructs the player 110 to act as the configurator (and thereafter resume the normal operational states). When the cloud coordinator 542 enters the configurator state, in addition to activating other components of the configurator controller 540, the cloud coordinator 542 may indicate to the streaming connectivity engine 532 that to increase the rate that data is stored in the streaming media buffer.

The radio controller 544 allocates radio resources, such as configuring TDM operations, configuring FDM operations, and/or allocation of separate radio resources for searching/detecting/provisioning and normal device operations. For example, in TDM, the radio controller 544 may switch the radio resources associated with the antenna 514 between normal operations, where the media player 110 is connected to the customer AP 120 via the radio link 112, and intervals during which the antenna 514 is repurposed to search for/detect the broadcast identifiers of devices to be provisioned 130 on the specified radio channel or channels. The radio controller 544 may also switches the radio resources between the link 112 to the provisioning AP 112 and the link 114 to a device to be provisioned, once a link is established.

The broadcast identifier search engine 546 searches for/detects the broadcast identifiers of devices to be provisioned 130 during the intervals where the radio controller 544 dedicates radio resources to configurator operations. The broadcast identifiers used by the devices to be provisioned may include, for example, a same prefix share by all devices to be provisioned ("IOTDev") followed by a series of numbers associated with the device's serial number ("IOTDev000345"). The broadcast identifier search engine 546 searches the list of nearby broadcast identifiers, searching for/detecting broadcast identifiers having the specified prefix ("IOTDDev"). If a determination has been made that the device associated with a particular broadcast identifier should be ignored (344), the corresponding broadcast identifier may be blacklisted by the broadcast identifier search engine 546, such that it will be skipped over in future scans if detected again.

As noted above, instead of a device to be provisioned 130 operating as a provisioning AP, emitting a broadcast identifier, with the configurator 110 searching for/detect the device to be provisioned 130, the configurator may instead act as the credentialing AP with the devices to be provisioned 130 instead searching for/detecting the configurator's provisioning AP broadcast identifier. As with the reverse arrangement, the configurator uses a preset broadcast identifier, such as a common prefix appended onto a portion of the configurator device's serial number. If using such an arrangement, a provisioning AP engine 548 (e.g., a SoftAP) activates the configurator's provisioning AP engine 548 in coordination with the radio controller 544. The broadcast identifier will typically broadcast the provisioning AP broadcast identifier signal every 100 ms. The devices to be provisioned each include their own broadcast identifier search engine 546, scanning for and detecting the configurator's provisioning AP broadcast identifier signal. An advantage of having the configurator 110 operate as the provisioning AP is the reduced RF clutter that may result if multiple new devices are all trying to broadcast identifier at a same time.

If the configurator 110 is using a shared TDM radio resource to act as a relay between the server 140 and the device to be provisioned, the relay buffer 550 stored communication packets in each direction as the radio controller 544 closes the link 112 to the customer AP 120 to open the link 114 to the device 130, and then closes the link 114 to the device 130 to reestablish the link 112 to the customer AP 120. As the radio controller 544 alternates between links, the relay buffer 550 temporarily stores packets until the path forward (in either direction) reopens.

The credentials provisioner 552 manages distribution of credentials stored in credentials storage 554 to the devices 130, along with any of provisioning information received from the server 140. If the configurator 110 is operating as a "dumb" relay between the server 140 and the device 130, but the credentials for the customer AP 120 are held by the configurator 110 (i.e., not in a cloud-based password locker), then the credentials provisioner 552 will share those credentials with the device 130 after the configurator 130 receives an authorization token from the server 140 to do so. If the configurator 110 is acting as a peer device, the credentials provisioner 552 also performs secret authentication with the devices needing to be provisioned, utilizing a token received from the server 140 that is based on the secret held by the device 130.

Figure 6:
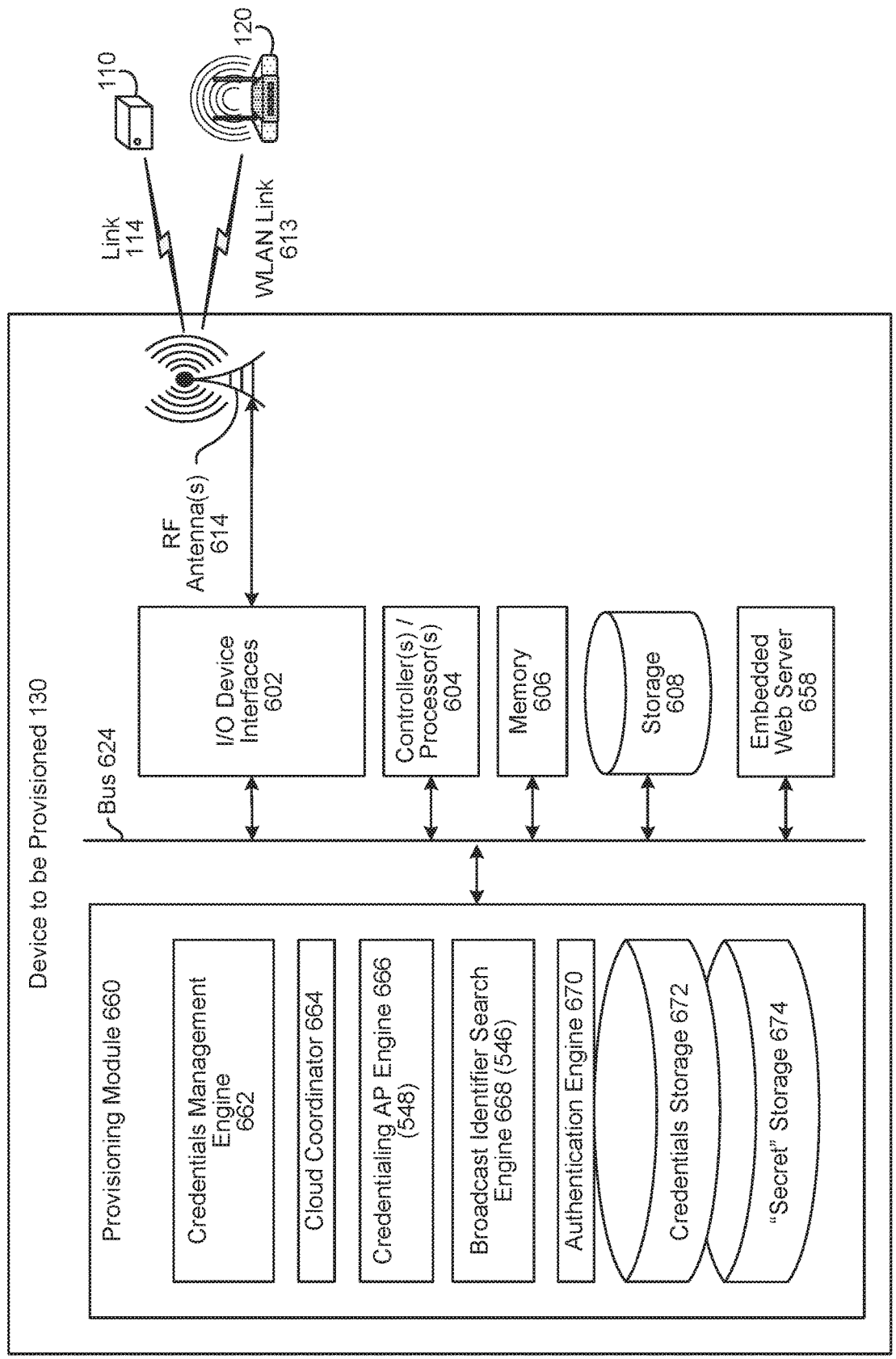
FIG. 6 is a block diagram conceptually illustrating example components of a device to be provisioned.

FIG. 6 is a block diagram conceptually illustrating example components of a device to be provisioned 130. In operation, the device to be provisioned 130 may include computer-readable and computer-executable instructions that reside on the device to be provisioned 130, as will be discussed further below.

As illustrated in FIG. 6, the device to be provisioned 130 may or may not provide a user interface for provisioning device. Each device to be provisioned may or may not provide a physical or virtual user interface by which a user can enter credentials for connecting the device 130 to a customer AP 120. As a back-up for provisioning the device 130 is no configurator 110 is available, the device 130 may include an embedded web server 658 built into the new device. The embedded web server 658 may be accessed via the device's provisioning AP engine 548, where the device 130 is found by its provisioning AP broadcast identifier, a connection is established to some other device of the user/customer 10 (e.g., a computer including a web browser and a user interface for entry of credentials), with credentials manually provided to the device 130 via the web server 658.

The device to be provisioned 130 includes input/output (I/O) device interfaces 602, which provide the device to be provisioned 130 with connectivity and protocol support. A variety of input and output connections may be made through the input/output device interfaces 602. For example, an RF antenna or antennas 614 may be used to provide connectivity to the customer AP 120, to the configurator 110, and/or to another access point that is open (referring to 216 in FIGS. 2A and 2B). The same RF antenna 614 or different antennas 614 may be used for the link 114 to the configurator 110 and for the direct link 613 to the customer AP 120 (once provisioned, as in step 354).

As described in connection to the streaming media player 110, a variety of protocols may be supported by the I/O device interfaces 602 for the links 114 and 613. For example, the link 114 to the configurator 110 may be a WLAN link (e.g., WiFi or WiFi Direct), a PAN link (e.g., Bluetooth, IrDA, wireless USB, Z-Wave, ZigBee, etc.), or an NFC link. The link 114 may be based on radio frequency (RF) communication, ultrasonic communication, infrared communication, or a wired connection such as Ethernet.

The input/output device interfaces 602 may also support other types of connections and communications protocols. For example, the device to be provisioned 130 may also include an interface for an external peripheral device connection such as universal serial bus (USB), FireWire, Thunderbolt or other wired connection protocol.

The I/O device interfaces 602 may also support other wireless connection protocols in addition to WLAN (e.g., WiFi, WiFi Direct), PAN (e.g., Bluetooth, IrDA), and/or NFC. For example, the device to be provisioned 130 may support cellular data communications such as communications via a Long Term Evolution (LTE) network, WiMAX network, CDMA network, GSM network, etc., which may be used for (among other things) as the accessible AP (referring to 216 in FIGS. 2A and 2B). The device to be provisioned 130 may include an address/data bus 624 for conveying data among components of the device 130. Each component within the device 130 may also be directly connected to other components in addition to (or instead of) being connected to other components across the bus 624.

The device 130 may include one or more controllers/processors 604, that may each include a central processing unit (CPU) for processing data and computer-readable instructions, and a memory 606 for storing data and instructions. The memory 606 may include volatile random access memory (RAM), non-volatile read only memory (ROM), non-volatile RAM (e.g., magnetoresistive MRAM) and/or other types of memory. The device 130 may also include a data storage component 608, for storing data and controller/processor-executable instructions (e.g., instructions to perform the processes performed by the device 130 in FIGS. 2A, 2B, 3A-3E, and 4A-4D). The data storage component 608 may include one or more non-volatile storage types such as magnetic storage, optical storage, solid-state storage, etc. The device 130 may also be connected to removable or external non-volatile memory and/or storage (such as a removable memory card, memory key drive, etc.) through the input/output device interfaces 602.

Computer instructions for operating the device 130 and its various components may be executed by the controller(s)/processor(s) 604, using the memory 606 as temporary "working" storage at runtime. The computer instructions may be stored in a non-transitory manner in non-volatile memory 606, storage 608, or an external device. Alternatively, some or all of the executable instructions may be embedded in hardware or firmware in addition to or instead of software.

The device 130 further includes a provisioning module 662. A credentials management engine 662 manages connecting to the customer AP 120 using credentials stored in credentials storage 672. When the credentials management engine 662 either lacks credentials (e.g., when the device 130 is activated for a first time) or is unable to connect to the customer AP 120, the credentials management engine 662 triggers the cloud coordinator 664, which may be a state machine managing provisioning operations as illustrated, for example, in FIGS. 2A and 2B.

Once a determination is made by the credentials management engine 662 that credentials are needed, the cloud coordinator 664 enters a needs-provisioning mode. In the need-provisioning mode, either the provisioning AP Engine 666 (e.g., a SoftAP) is activated to emit the known broadcast identifier on a channel specified in firmware (e.g., operating in the same manner as the provisioning AP Engine 548), or the broadcast identifier search engine 668 begins scanning for a provisioning AP broadcast identifier from the configurator (e.g., in a similar manner to the broadcast identifier search engine 546, but without necessarily needing to coordinate time windows for the use of the WLAN antenna 614).

After a link 114 is established to the configurator, the cloud coordinator 664 enters an authentication state. An authentication engine 670 prepares a response to a received authentication challenge, using the "secret" stored in storage 674, with the cloud coordinator 664 sending the response to the configurator 110. Thereafter, the cloud coordinator state machine enters a receive-provisioning mode, storing received credential in the credentials storage, and triggering the credentials management engine 662 to establish the direct link 613 with the customer AP 120. After the direct link 613 is establish, the cloud coordinator 664 enters a confirmation mode, sending a message to the server 140 to inform the server that provisioning was successful. Thereafter, the cloud coordinator 664 may enter a sleep state, remaining in the sleep state until another trigger is received from the credentials management engine 662.

A device to be provisioned 130 may also include a configurator controller 540 and/or be loaded with (or instantiate) software to configure the controller(s)/processor(s) 604 to perform the operations of the configurator controller 540 after provisioning. After a device 130 is provisioned, it may be reconfigured to serve as a configurator 110, such that there may be multiple configurators 110 in a single system operating as a configurator group. For example, a set-top box may be used to provision a tablet computer, and then the tablet computer may be used to provision a "smart" bulb. In addition to reducing the burden on the original device serving as the configurator 110, having multiple configurators 110 in the same system may expand the physical area over which the device can detects devices 130 to be provisioned, and/or devices 130 to be provisioned can detect a configurator 110.

FIG. 7 is a block diagram conceptually illustrating example components of the server 140. In operation, the server 140 may include computer-readable and computer-executable instructions that reside on the server 140, as will be discussed further below.

The server 140 may include one or more controllers/processors 704, that may each include a central processing unit (CPU) for processing data and computer-readable instructions, and a memory 706 for storing data and instructions. The memory 706 may include volatile random access memory (RAM), non-volatile read only memory (ROM), non-volatile RAM (e.g., magnetoresistive MRAM) and/or other types of memory. The server 140 may also include a data storage component 708, for storing data and controller/processor-executable instructions (e.g., instructions to perform the steps illustrated in FIGS. 3A-3E and 4A-4D. The data storage component 708 may include one or more non-volatile storage types such as magnetic storage, optical storage, solid-state storage, etc. The server 140 may also be connected to removable or external non-volatile memory and/or storage (such as a removable memory card, memory key drive, networked storage, etc.) through the input/output device interfaces 702.

Computer instructions for operating the device 110 and its various components may be executed by the controller(s)/processor(s) 702, using the memory 704 as temporary "working" storage at runtime. The computer instructions may be stored in a non-transitory manner in non-volatile memory 704, storage 708, or an external device. Alternatively, some or all of the executable instructions may be embedded in hardware or firmware in addition to or instead of software.

The server 140 includes input/output device interfaces 702. A variety of components may be connected through the input/output device interfaces 702. The input/output device interfaces 702 may also include an interface for an external peripheral device connection such as universal serial bus (USB), FireWire, Thunderbolt or other connection protocol to connect to one or more databases 142 storing the user and device profile data. The input/output device interfaces 702 may also include a connection to one or more networks 199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 199, the components of the server 140 may be distributed across a networked environment.

The server 140 may include an address/data bus 724 for conveying data among components of the server 140. Each component within the server 140 may also be directly connected to other components in addition to (or instead of) being connected to other components across the bus 724.

The server 140 further includes a provisioning module 770 that supports the cloud-based provisioning service, performing the steps associated with the server as discussed in connection with FIGS. 3A-3E, and 4A-4D.

A device coordinator 772 acts as a communication bridge between the server 140 and other devices in the system, including configurators 110 and devices that need to be provisioned 130. The device coordinator 772 may begin a provisioning routine in response to a message from a configurator 110 that credentials have changed (e.g., 316 in FIGS. 3A and 3D, 317 in FIGS. 3B, 3C, and 3E), in response to the configurator 110 connecting a device 130 that the configurator 110 detected to the server 140 (e.g., 324 in FIGS. 3A-3E and 4A-4D), in response to a notification from a product sales system 797 that a device that will need to be provisioned is being shipped (e.g., 412 in FIGS. 4A-4D), and/or some other messaging that indicates that there will be a need for provisioning.

When a determination is made by the device coordinator 772 that there will need to be provisioning, a provisioning list manager determines a list of devices to be provisioned based upon data in the user/device data 142, information received from the product sales system 797, and/or information received from the package tracking system 798. As the devices are provisioned, the provisioning list manager 774 will update the list.

A device profile and secret management engine 776 accesses information regarding the secret associated with the device to be provisioned 130, as stored in the user/device data database 142, and provides information based on the secret to the device authenticator 778. The device authenticator 778 authenticates the device 130 based on the secret, or prepares and send an authentication token to the configurator 110 so that the configurator may authenticate the device 130. A product arrival coordination engine 780 serves as a bridge to a product sales system 797 and/or a package tracking system 798, providing an indication or estimate of when a product will arrive (or arrived) at the location of the configurator to the device coordinator 772 and/or the provisioning list manager 774. The indication or estimate of when a product will arrive may be, or may be used to determine, a range of times corresponding to a period of time when the device coordinator 772 should configure operations of the provisioning module 770 for provisioning the new device 130.

Multiple servers 140 may be employed in a system. In such a multi-server system, each of the servers 140 may include different components for performing different aspects of the cloud-driven provisioning process. The multiple servers may include overlapping components. The components of server 140 as illustrated in FIG. 7 are examples, and may be a stand-alone device or may be included, in whole or in part, as a component of a larger device or system.

The concepts disclosed herein may be applied within a number of different devices and computer systems, including, for example, general-purpose computing systems, multimedia set-top boxes, server-client computing systems, mainframe computing systems, laptop computers, cellular phones, tablet computers, wearable computing devices (watches, glasses, etc.), other devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and automatic device provisioning, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more the components of the modules 530, 540, 660, 770 may be implemented as firmware or as a state machine in hardware. For example, at least the cloud coordinators 542 and 664 may be implemented as state machines using field programmable gate arrays (FPGAs). The embedded web server 658 and provisioning AP engines 548 and 666 may be implemented as an application specific integrated circuits (ASICs).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    configuring a first device to enter a mode to allow wireless communications between the first device and a second device;
    determining the first device and the second device are associated with a user account;
    determining, based at least in part on the association, that the second device is configured to establish wireless communications between the first device and the second device;
    establishing a wireless connection between the first device and the second device;
    receiving, by the second device from the first device, a first wireless signal corresponding to a connection request from the first device, the first wireless signal including first data identifying the first device;
    sending, by the second device to at least one server, the first data identifying the first device;
    receiving, by the second device from the at least one server, second data corresponding to the second device; and
    processing the second data by the second device to establish the wireless connection between the first device and second device.

2. The computer-implemented method of claim 1, further comprising:
    processing the second data by the second device comprises processing the second data to determine output data; and
    using the output data to establish the wireless connection.

3. The computer-implemented method of claim 1, wherein the second data corresponds to encoded data.

4. The computer-implemented method of claim 3, further comprising:
    establishing the wireless connection based at least in part on the encoded data.

5. The computer-implemented method of claim 3, further comprising:
    processing, by the at least one server, the first data identifying the first device to determine the second data.

6. The computer-implemented method of claim 1, further comprising:
    processing, by the second device, encoded data corresponding to the first device with reference data to authenticate the encoded data,
    wherein establishment of the wireless connection is based at least in part on authentication of the encoded data.

7. The computer-implemented method of claim 6, wherein the encoded data corresponds to symmetric encoded data.

8. The computer-implemented method of claim 6, wherein the encoded data corresponds to asymmetric encoded data.

9. The computer-implemented method of claim 1, wherein the first wireless signal comprises a Bluetooth low energy message comprising an identifier corresponding to the first device.

10. The computer-implemented method of claim 1, further comprising:
    sending confirmation data indicating that the wireless connection has been established.

11. A system comprising:
    at least one processor; and
    at least one memory comprising instructions that, when executed by the at least one processor, cause the system to:
        configure a first device to enter a mode to allow wireless communications between the first device and a second device;
        determine the first device and the second device are associated with a user account;
        determine, based at least in part on the association, that the second device is configured to establish wireless communications between the first device and the second device;
        establish a wireless connection between the first device and the second device;
        receive, by the second device from the first device, a first wireless signal corresponding to a connection request from the first device, the first wireless signal including first data identifying the first device;
        send, by the second device to at least one server, the first data identifying the first device;
        receive, by the second device from the at least one server, second data corresponding to the second device; and
        process the second data by the second device to establish the wireless connection between the first device and second device.

12. The system of claim 11, wherein the at least one memory further comprises instructions that, when executed by the at least one processor, further cause the system to:
    process the second data by the second device comprises processing the second data to determine output data; and
    use the output data to establish the wireless connection.

13. The system of claim 11, wherein the second data corresponds to encoded data.

14. The system of claim 13, wherein the at least one memory further comprises instructions that, when executed by the at least one processor, further cause the system to:
    establish the wireless connection based at least in part on the encoded data.

15. The system of claim 13, wherein the at least one memory further comprises instructions that, when executed by the at least one processor, further cause the system to:
    process, by the at least one server, the first data identifying the first device to determine the second data.

16. The system of claim 11, wherein the at least one memory further comprises instructions that, when executed by the at least one processor, further cause the system to:
    process, by the second device, encoded data corresponding to the first device with reference data to authenticate the encoded data,
    wherein establishment of the wireless connection is based at least in part on authentication of the encoded data.

17. The system of claim 16, wherein the encoded data corresponds to symmetric encoded data.

18. The system of claim 16, wherein the encoded data corresponds to asymmetric encoded data.

19. The system of claim 11, wherein the first wireless signal comprises a Bluetooth low energy message comprising an identifier corresponding to the first device.

20. The system of claim 11, wherein the at least one memory further comprises instructions that, when executed by the at least one processor, further cause the system to:
 send confirmation data indicating that the wireless connection has been established.

* * * * *